(12) United States Patent
Akita

(10) Patent No.: US 10,965,350 B1
(45) Date of Patent: Mar. 30, 2021

(54) ELECTRONIC DEVICE AND METHOD

(71) Applicant: KABUSHIKI KAISHA TOSHIBA, Tokyo (JP)

(72) Inventor: Koji Akita, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/816,186

(22) Filed: Mar. 11, 2020

(30) Foreign Application Priority Data

Sep. 13, 2019 (JP) .............................. JP2019-167703

(51) Int. Cl.
| | |
|---|---|
| *H04B 7/04* | (2017.01) |
| *H04B 7/0426* | (2017.01) |
| *H04B 7/08* | (2006.01) |
| *H01Q 21/06* | (2006.01) |
| *H04W 16/28* | (2009.01) |
| *H01Q 3/24* | (2006.01) |

(52) U.S. Cl.
CPC ............... *H04B 7/043* (2013.01); *H01Q 3/24* (2013.01); *H01Q 21/061* (2013.01); *H04B 7/082* (2013.01); *H04B 7/0825* (2013.01); *H04B 7/0874* (2013.01); *H04W 16/28* (2013.01)

(58) Field of Classification Search
CPC ........ H01Q 21/061; H01Q 3/24; H01Q 9/285; H01Q 21/065; H01Q 21/00; H04B 7/0617; H04B 7/02; H04B 7/088; H04B 7/0814; H04B 7/0825; H04B 7/043

USPC .................................................. 375/267, 299
See application file for complete search history.

(56) References Cited

U.S. PATENT DOCUMENTS

| | | | | |
|---|---|---|---|---|
| 6,275,181 | B1 * | 8/2001 | Kitayoshi | G03H 5/00 342/74 |
| 2012/0320962 | A1 | 12/2012 | Takai et al. | |
| 2015/0301185 | A1 * | 10/2015 | Shin | G01R 29/10 342/357.62 |
| 2017/0085289 | A1 * | 3/2017 | Jan | H01Q 21/24 |
| 2019/0165454 | A1 * | 5/2019 | Lee | H01Q 21/28 |
| 2019/0165478 | A1 * | 5/2019 | Jo | H01Q 21/062 |
| 2019/0386400 | A1 * | 12/2019 | Wu | H01Q 21/24 |
| 2020/0021015 | A1 * | 1/2020 | Yun | H01Q 1/38 |
| 2020/0083948 | A1 * | 3/2020 | Lim | H01Q 3/2605 |
| 2020/0145977 | A1 * | 5/2020 | Kumar | G01S 5/12 |

FOREIGN PATENT DOCUMENTS

| | | |
|---|---|---|
| JP | 2010164469 A | 7/2010 |
| JP | 5351327 B2 | 8/2013 |
| WO | 2011105075 A1 | 9/2011 |

\* cited by examiner

*Primary Examiner* — Emmanuel Bayard
(74) *Attorney, Agent, or Firm* — Holtz, Holtz & Volek PC

(57) ABSTRACT

According to one embodiment, an electronic device comprises a first antenna includes first antenna elements on a first planar substrate, a second antenna includes second antenna elements on a second planar substrate, an orientation of the second planar substrate being different from an orientation of the first planar substrate, and a circuit that forms a first beam pattern using the first antenna elements, forms a second beam pattern using the second antenna elements, and forms a first combined beam pattern using some of the first antenna elements and some of the second antenna elements.

20 Claims, 17 Drawing Sheets

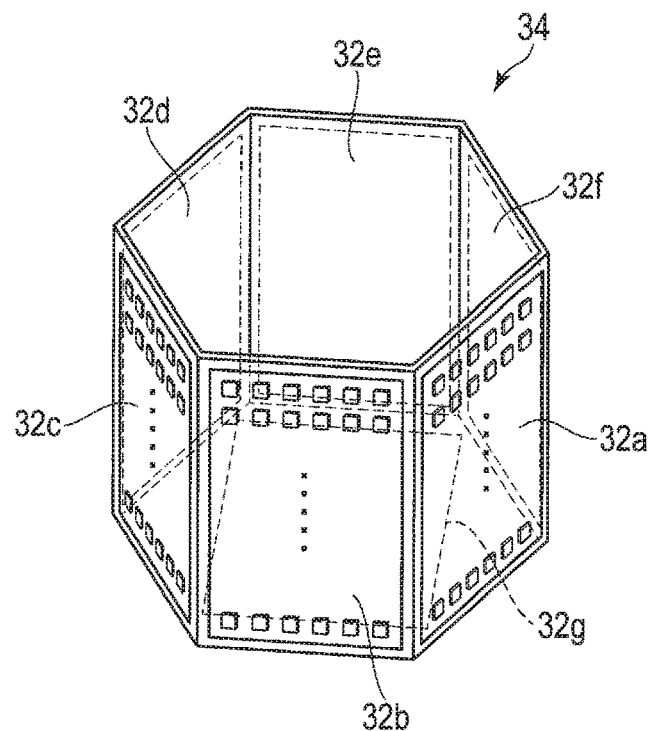
F I G. 2A
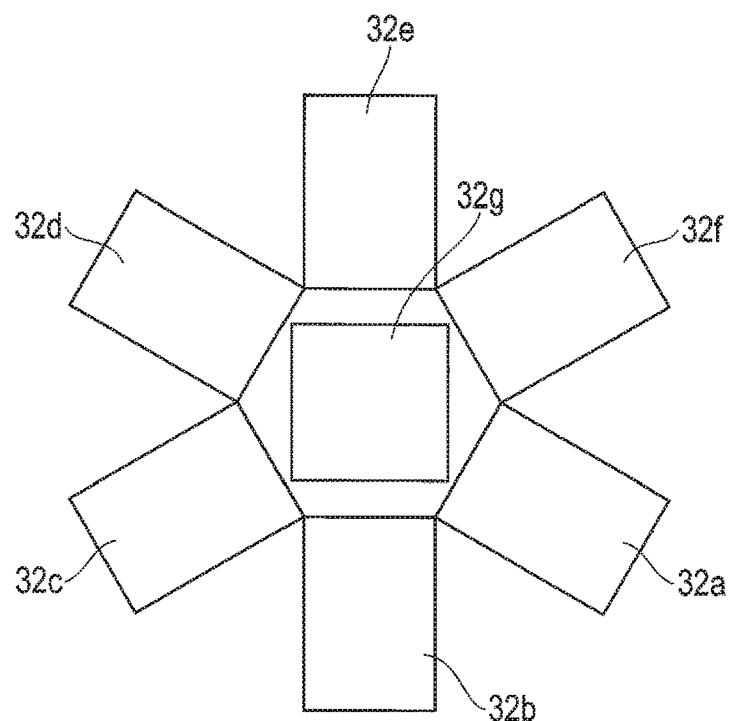
F I G. 2B

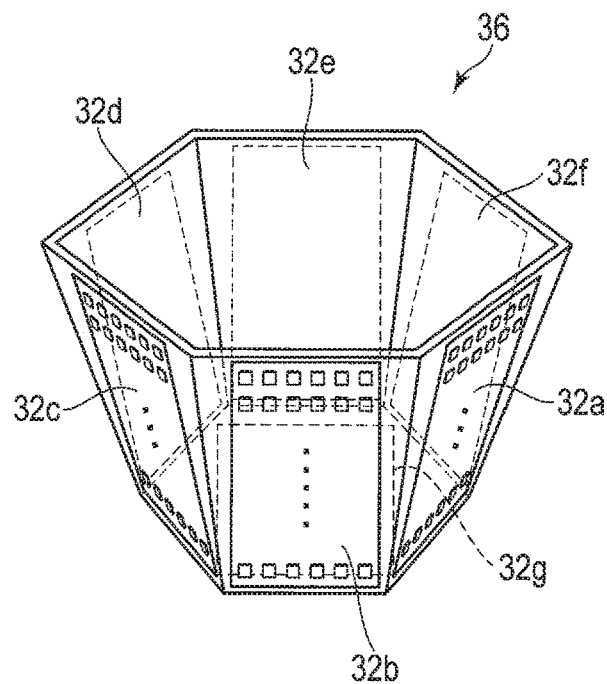
F I G. 3A
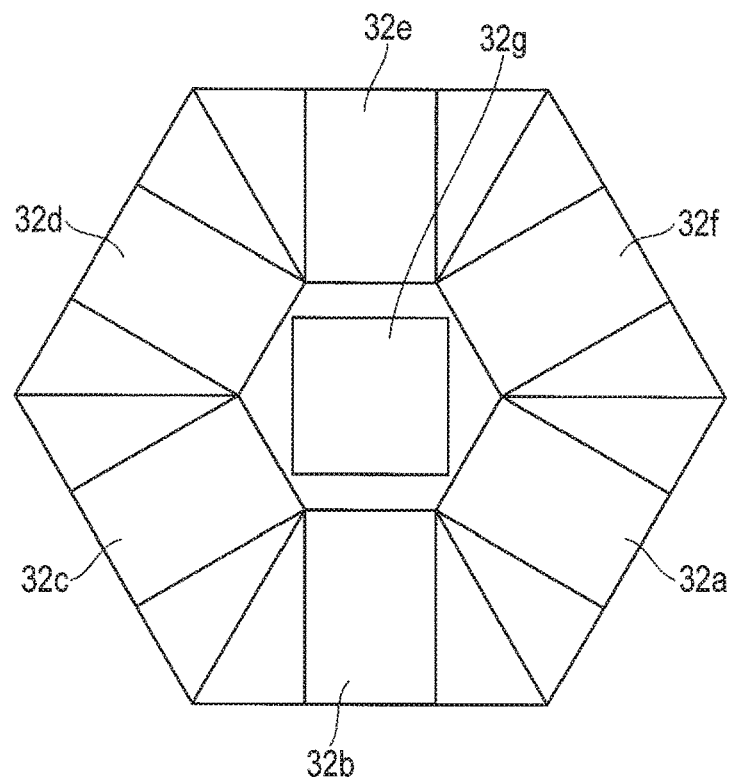
F I G. 3B

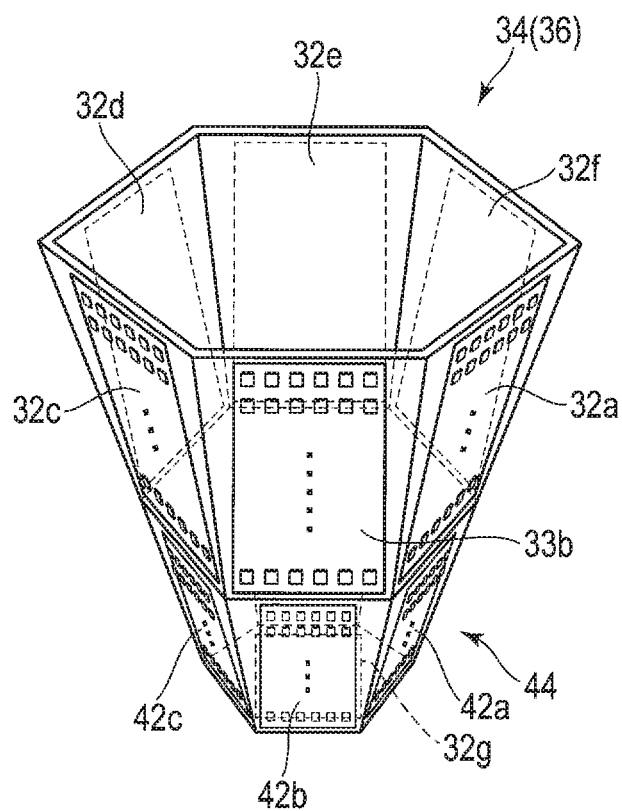
F I G. 7A
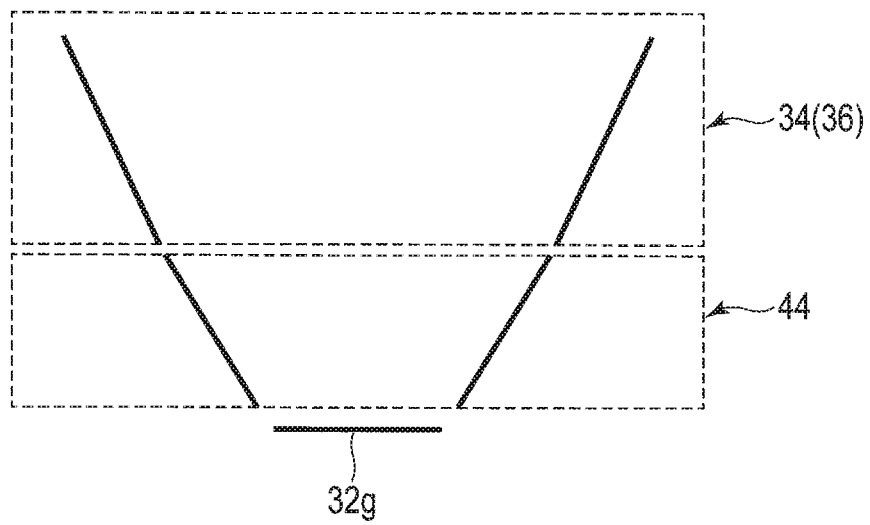
F I G. 7B

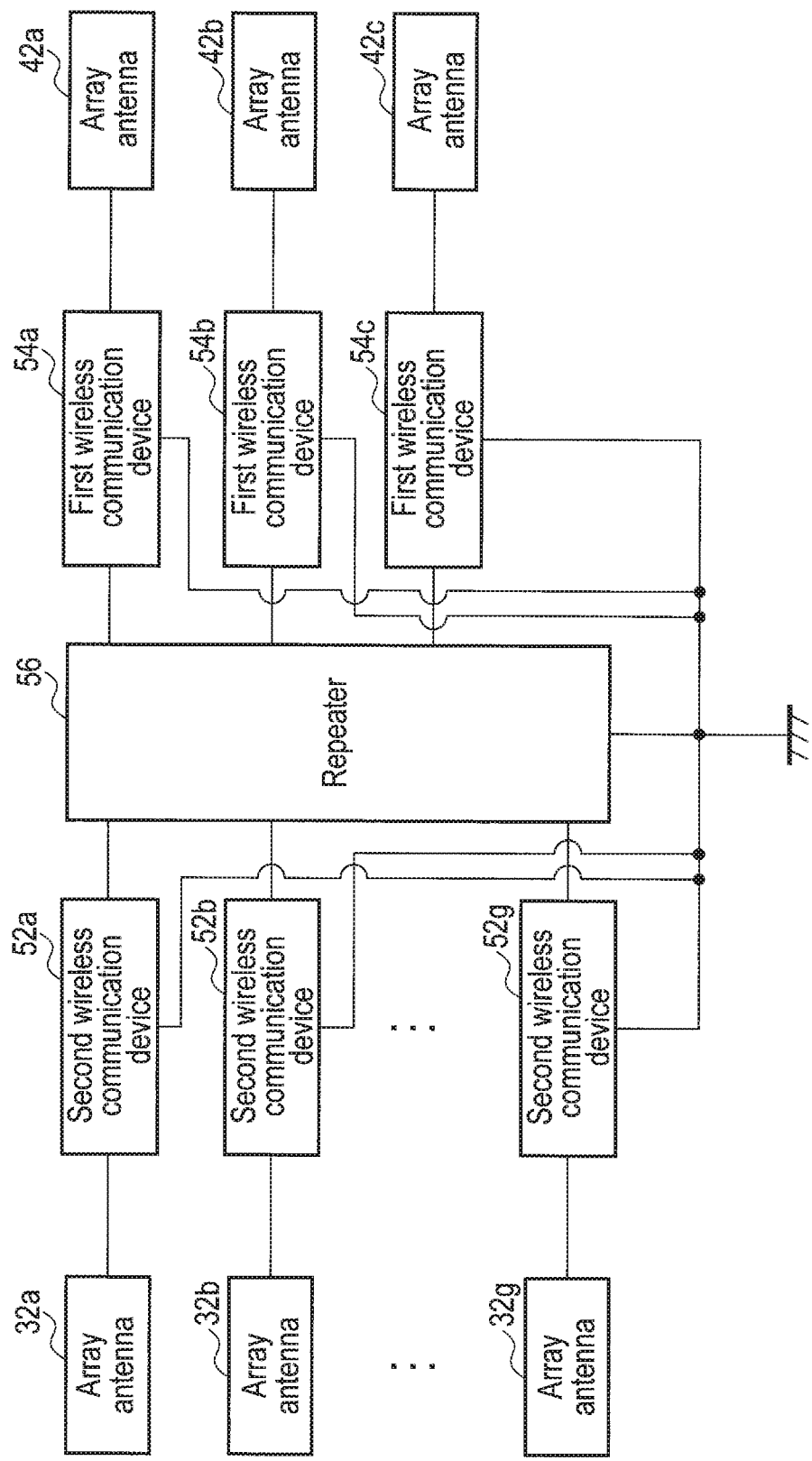
F I G. 9

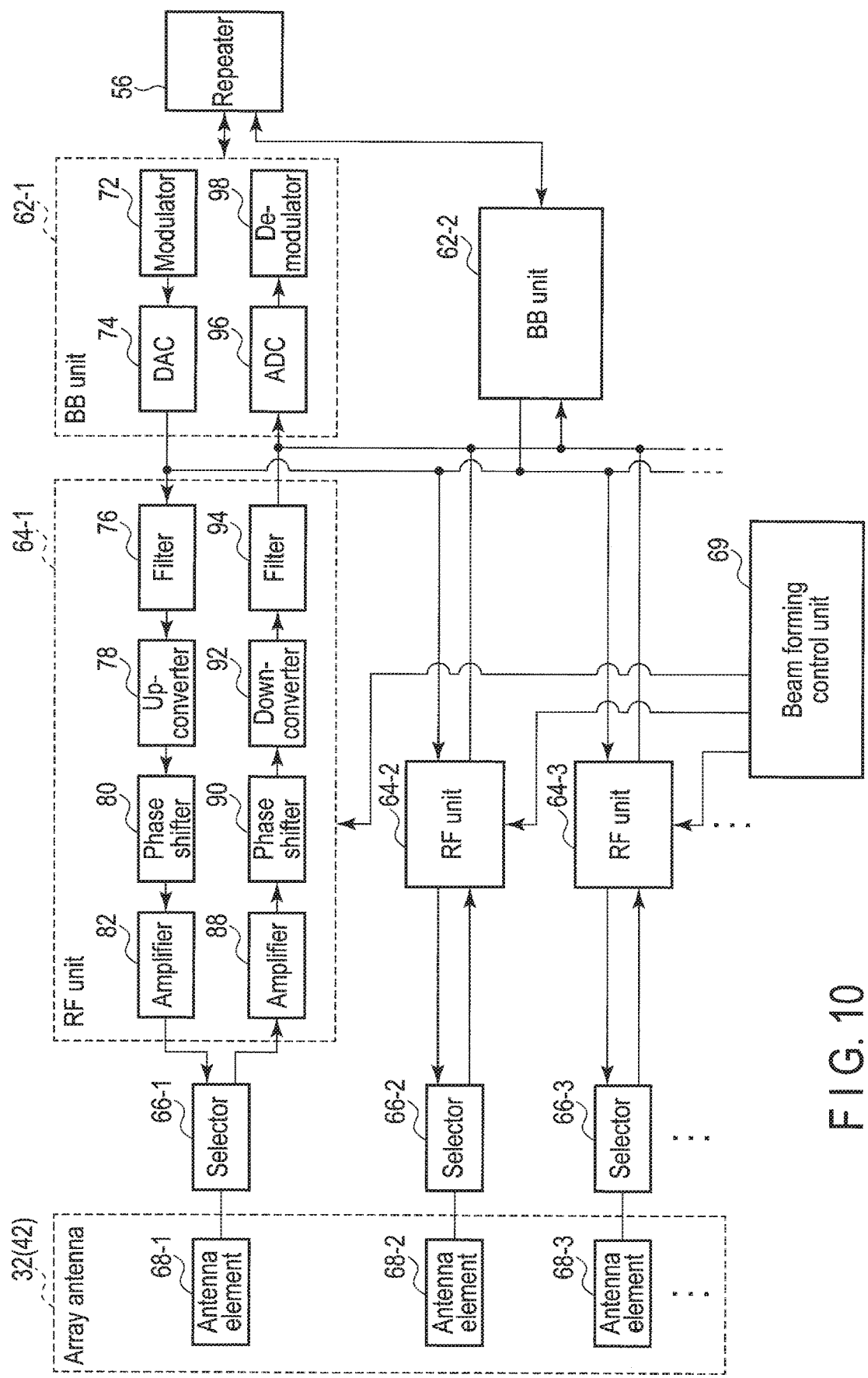
F I G. 10

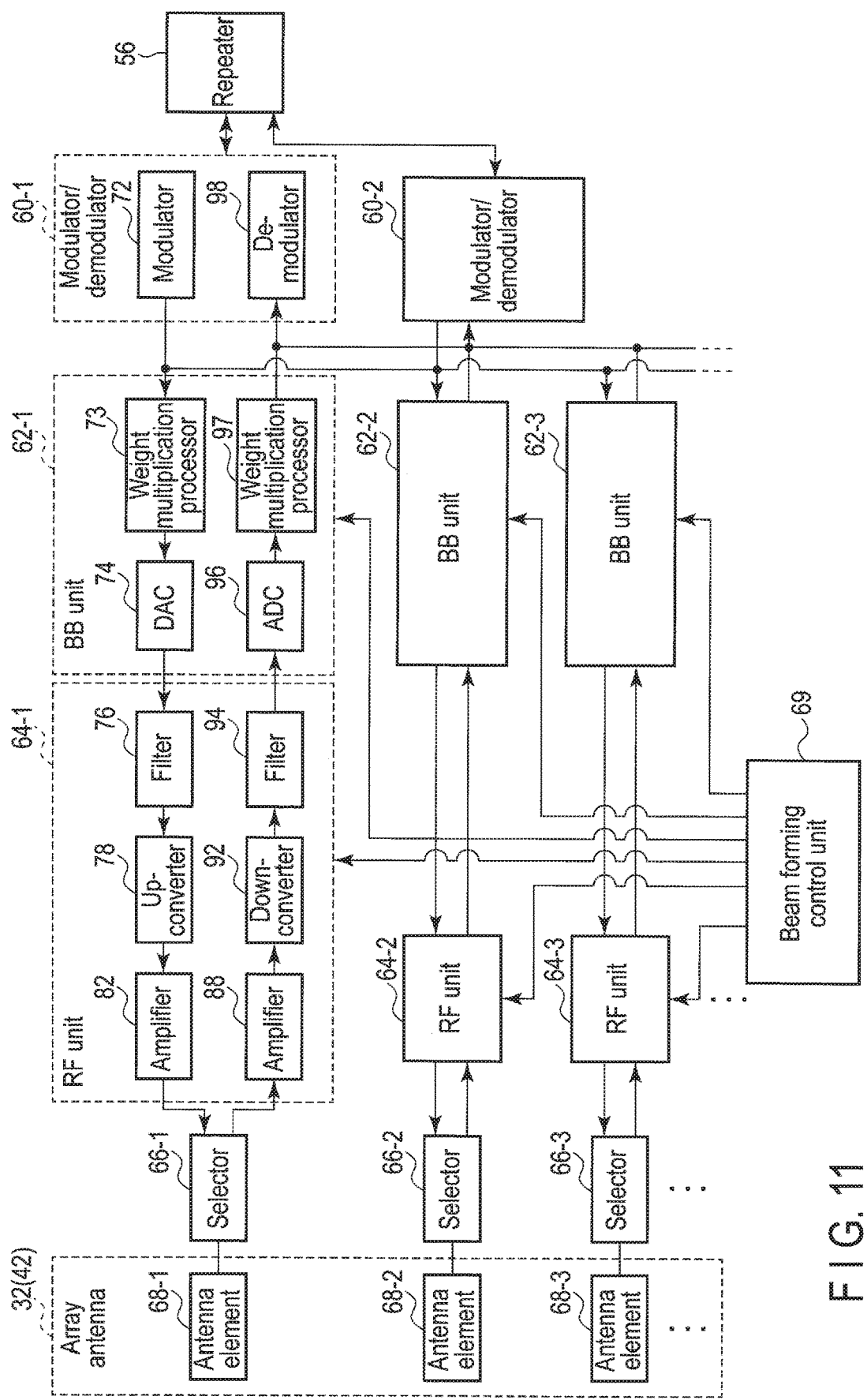
F I G. 11

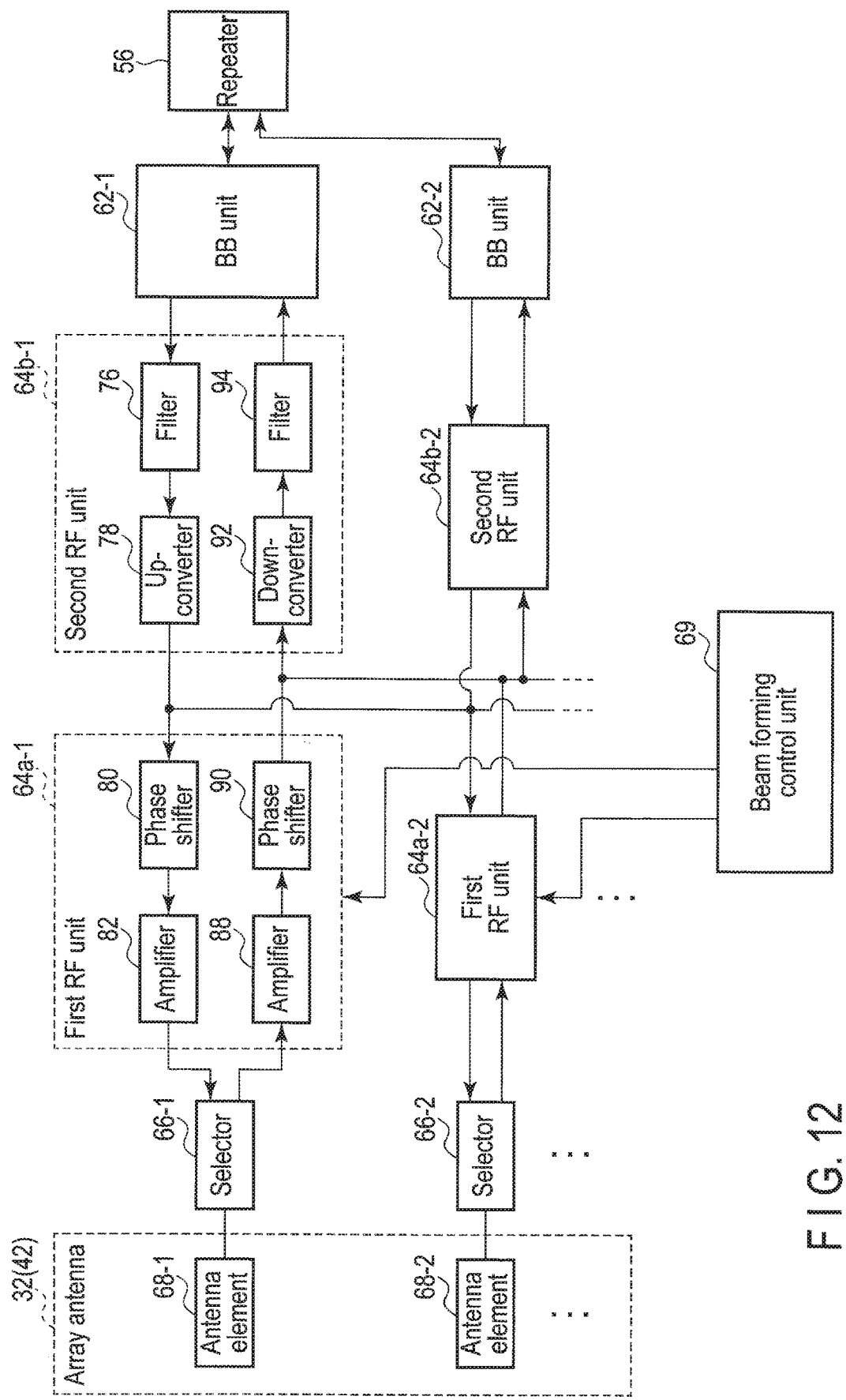
F I G. 12

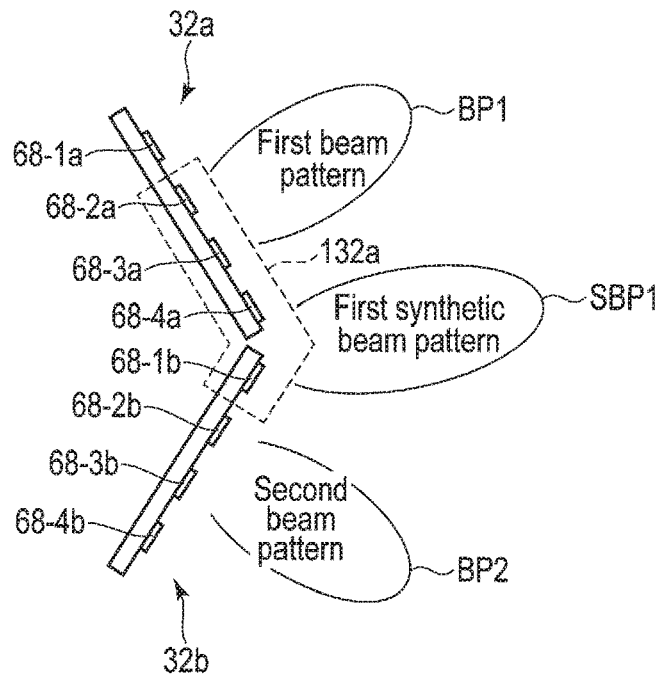
F I G. 15A
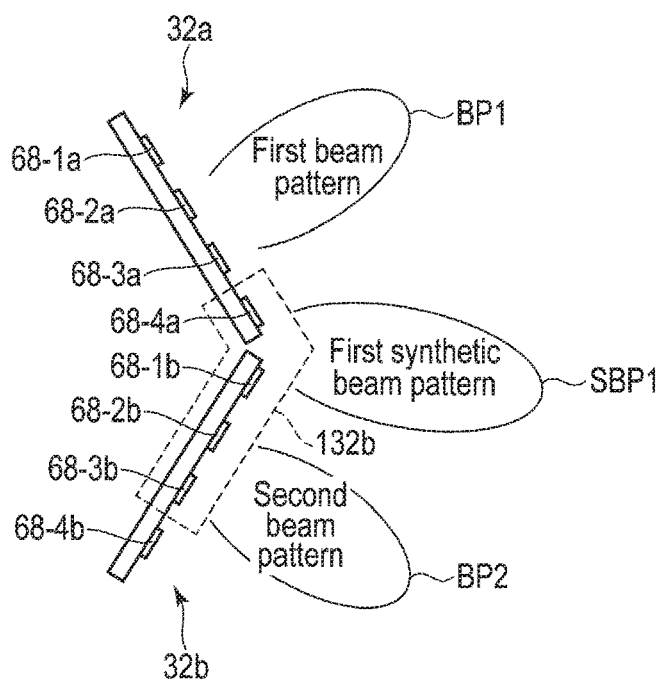
F I G. 15B

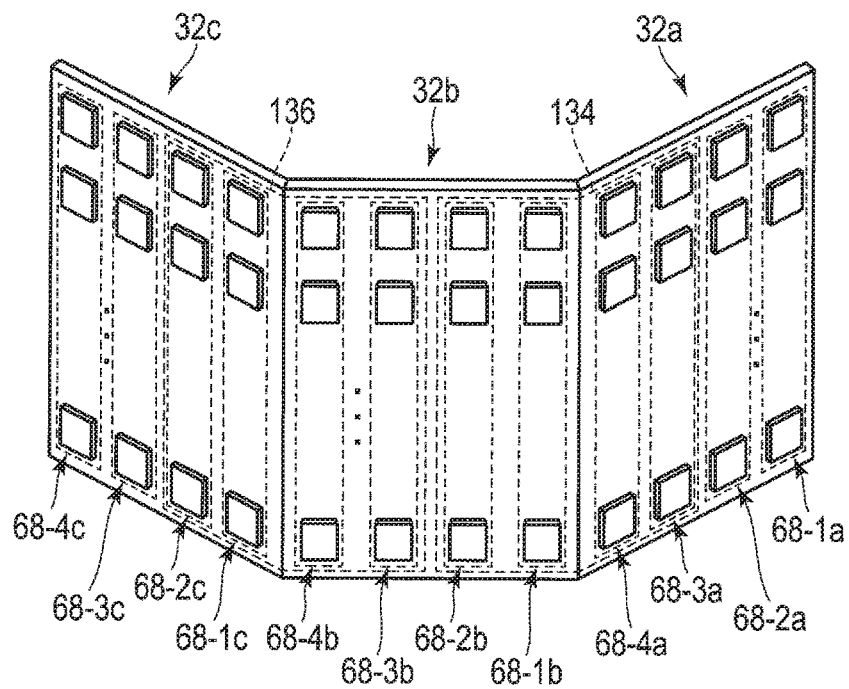
F I G. 16A
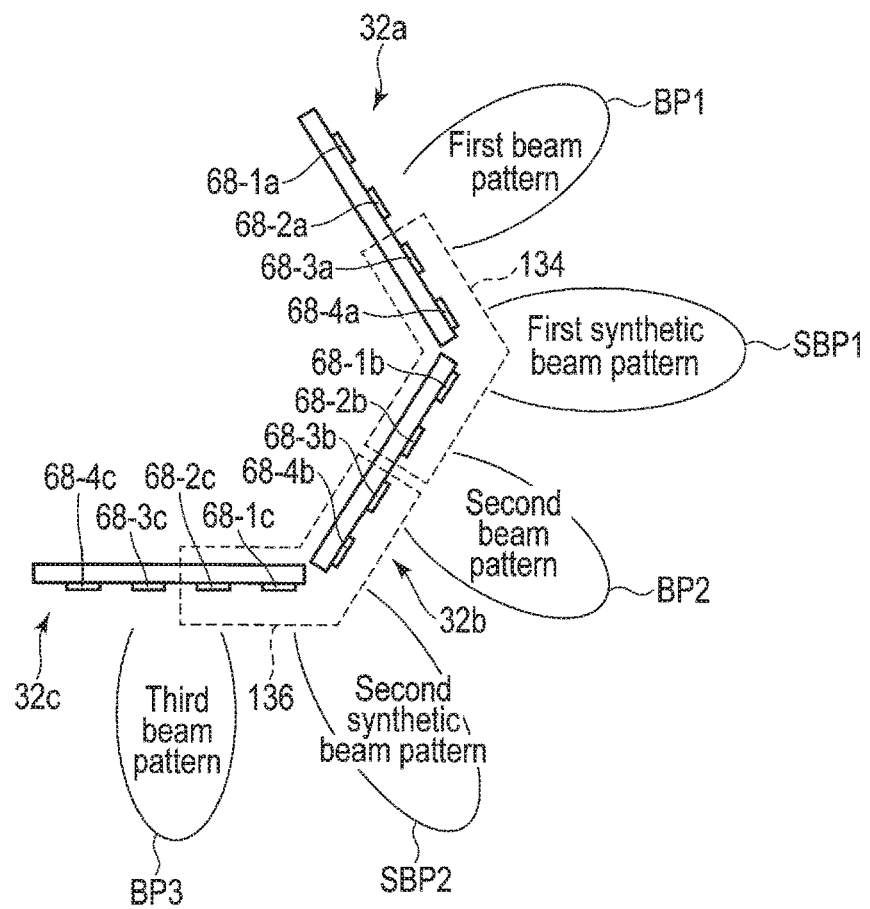
F I G. 16B

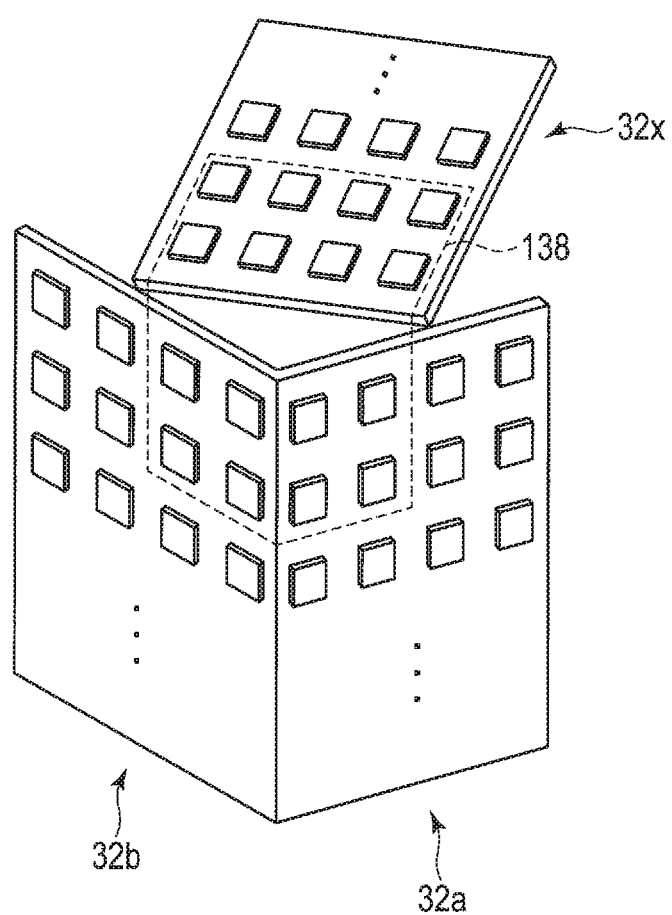
F I G. 17

ELECTRONIC DEVICE AND METHOD

CROSS-REFERENCE TO RELATED APPLICATIONS

This application is based upon and claims the benefit of priority from Japanese Patent Application No. 2019-167703, filed Sep. 13, 2019, the entire contents of which are incorporated herein by reference.

FIELD

Embodiments described herein relate generally to a beam forming.

BACKGROUND

In wireless communications, a beam forming technic is used. The direction in which an electromagnetic wave mainly irradiated from an array antenna is called a beam pattern. In the beam forming technic, the beam pattern is changed by inputting the same signal with different phases and amplitudes to antenna elements of the array antenna. The beam forming technic is also used for receiving an electromagnetic wave.

The antenna elements of the array antenna are formed on a planar substrate. In the beam forming technic, it is easy to form a beam pattern in a direction orthogonal to the substrate of the array antenna. It is difficult to form a beam pattern in a direction other than a normal direction of the substrate of the array antenna. If a direction of the beam pattern deviates from the orthogonal direction of the substrate, a precision of the beam pattern is lowered. If the precision of the beam pattern is lowed, a power of an electromagnetic wave in a main direction is decreased and a power of an electromagnetic wave in other directions is increased. It is hardly possible to form a beam pattern in a direction in parallel to the substrate of the array antenna.

If array antennas are arranged such that orientations of substrates of the array antennas are different from each other, it is possible to form beam patterns of different directions. If two array antennas are arranged such that the orientation of the substrate of the first array antennas is different from the orientation of the substrate of the second array antennas by 90 degrees, it is possible to form a beam pattern in a direction orthogonal to the substrate of the array antenna and a beam pattern in a direction in parallel to the substrate of the array antenna.

In order to form a variety of beam patterns, array antennas must be positioned in accordance with the beam patterns. Therefore, the number of array antennas and the number of antenna elements are increased when the number of beam patterns to be formed is increased. It is difficult to install many array antennas having many antenna elements in a wireless communication device.

BRIEF DESCRIPTION OF THE DRAWINGS

FIGS. 2A and 2B are diagrams showing an example of a service link antenna device.

FIGS. 3A and 3B are diagrams showing another example of the service link antenna device.

FIGS. 7A and 7B are diagrams showing another example of arrangement of the service link antenna device and the feeder link antenna device.

FIG. 9 is a block diagram showing an example of a wireless relay device.

FIG. 10 is a block diagram showing an example of a wireless communication device.

FIG. 11 is a block diagram showing another example of the wireless communication device.

FIG. 12 is a block diagram showing still another example of the wireless communication device.

FIGS. 15A and 15B are diagrams showing another example of a combined beam pattern.

FIGS. 16A and 16B are diagrams showing further example of a combined beam pattern.

FIG. 17 is a diagram showing still another example of a combined beam pattern.

DETAILED DESCRIPTION

Figure 1:
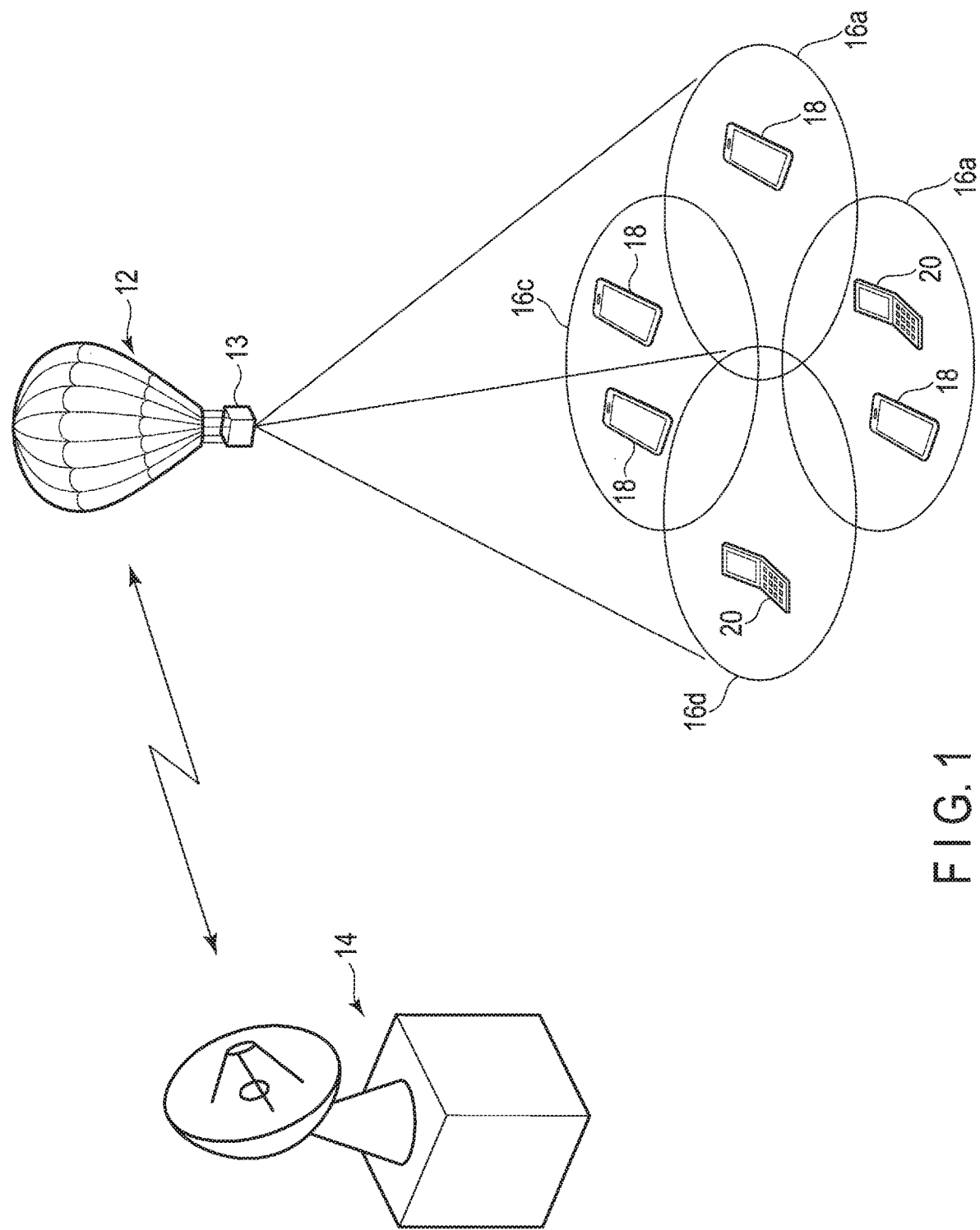
FIG. 1 is a diagram showing an example of a wireless communication system including an electronic device according to a first embodiment.

The embodiments will be described below with reference to the drawings. The following description exemplifies a device and a method for embodying a technical idea of the embodiments, and the technical idea of the embodiments is not limited to the structure, shape, arrangement, material, and the like of the components described below. Variations that can be easily devised by a person skilled in the art are naturally included in the scope of the disclosure. For the purpose of a clearer description, the size, thickness, planar dimensions, shape, or the like of each element may be schematically expressed in the drawings by modifying it with respect to the actual embodiments. A plurality of the drawings may include elements having dimensional relationships or ratios different from one another. In a plurality of the drawings, redundant descriptions may be omitted by giving same reference numerals to corresponding elements. Some elements may be given a plurality of names but examples of such names are merely illustrative and do not negate giving other names to those elements. It is not to be negated that an element that has not been given a plurality of names is given another name. In the following description, "connection/connect" means not only direct connection but also connection via another element such as wireless communication.

In general, according to one embodiment, an electronic device comprises a first antenna comprising first antenna elements on a first planar substrate; a second antenna comprising second antenna elements on a second planar substrate, an orientation of the second planar substrate being different from an orientation of the first planar substrate; and a circuit that forms a first beam pattern using the first antenna elements, forms a second beam pattern using the second antenna elements, and forms a first combined beam pattern using some of the first antenna elements and some of the second antenna elements.

FIG. 1 shows an example of a wireless communication system including an electronic device of the first embodiment. Wireless communication between a wireless communication device and a base station device 14 is relayed by a wireless relay device (hereinafter, simply referred to as a relay device) 13. An example of the wireless communication device includes a smartphone 18 and a cellular phone 20. Note that the relay device 13 may perform wireless communication with not only the base station device 14 but also a wireless communication device equivalent thereto. The wireless communication device such as the cellular phone 20 may be a terminal device capable of communicating with the base station device 14.

Both the base station device 14 and the relay device 13 may be permanent equipment, meanwhile the relay device 13 may be temporary equipment for emergency response. The base station device 14 is installed on the ground, on the rooftop of a building, or on a steel tower. The relay device 13 may also be mounted on a rooftop of an automobile, an airplane, an airship, a balloon, or a satellite. In the example of FIG. 1, the relay device 13 is mounted on a balloon 12. When a certain base station device breaks down, or when the number of terminal devices in a specific area temporarily increases due to an event or the like, the balloon 12, the airship, or the vehicle equipped with the relay device 13 is moved to the broken down base station device or the specific area.

Wireless communication between the relay device 13 and the base station device 14 is referred to as a feeder link, and wireless communication between the relay device 13 and a wireless communication device such as the smartphone 18, the cellular phone 20, or the like is referred to as a service link. The relay device 13 includes an antenna and a wireless communication device for the service link and an antenna and a wireless communication device for the feeder link. The service link wireless communication device and the feeder link wireless communication device are electrically connected to each other and exchange signals between the both wireless communication devices.

The relay device 13 performs beam forming in order to form cells 16a, 16b, . . . for the wireless communication device, and forms beam patterns directed toward the ground for the cells. In this specification, the cells 16a, 16b, . . . may be collectively referred to as a cell 16. In the example shown in FIG. 1, the number of cells is 4, but the number of cells and the size of the cells can be determined in view of the required communication area size, communication quality, communication capacity, and the like.

FIGS. 2A and 2B show an example of a service link antenna device 34. FIG. 2A is a perspective view of the antenna 34, and FIG. 2B shows a state in which the antenna 34 of FIG. 2A is developed on a plane.

The service link antenna device 34 is often desired to form beam patterns in a range of approximately 360 degrees. In that case, as shown in FIG. 2A, array antennas (six antennas in this example) 32a to 32f are arranged respectively on the outer surfaces of side surfaces (six surfaces in this example) of the frame of an n-dimensional prism (n is a positive integer of 3 or greater, here a regular hexagonal prism) along a substantially vertical direction. When the regular hexagonal prism is used, the angle defined by two adjacent array antennas in the array antennas 32a to 32f is about 120 degrees. It is possible to determine the number of side surfaces of the polygon in view of the required communication area size, communication quality, communication capacity, and the like. The regular hexagonal prism may be along any direction other than the substantially vertical direction. The orientation of the regular hexagonal prism can also be determined in view of the required communication area size, communication quality, communication capacity, and the like. Furthermore, the shape of the frame may be an n-dimensional prism, and it is not limited to a regular n-dimensional prism.

Another array antenna 32g is also arranged on the regular hexagonal bottom surface (substantially horizontal surface near the ground surface) of the frame of the regular hexagonal prism. The array antennas 32a to 32f include a rectangular substrate (hereinafter simply referred to as a substrate) and antenna elements arranged on the substrate in a two-dimensional array. The substrate includes a ground conductor and two dielectrics sandwiching the ground conductor. Square antenna elements composed of a conductor are arranged on the surface of the dielectric. In general, a size (length of one side of the square) W of the antenna element is $\lambda/(2\times\varepsilon^{1/2})$, but it may be slightly shifted. $\lambda$ is the wavelength of electromagnetic wave and is the reciprocal of the frequency of electromagnetic wave. $\varepsilon$ is the dielectric constant of the dielectric of the substrate that the antenna element is in contact with. In general, since $\varepsilon$ is 1 or more, the size W is shorter than a half wavelength. For example, when $\varepsilon$ is 4.0, the size W is a ¼ wavelength. In general, a distance D (distance (pitch) between the center of an element and the center of an element) between antenna elements is a half wavelength, but it may be slightly shifted.

In the example of FIGS. 2A and 2B, the shape of the substrate of the array antennas 32a to 32f is rectangular, but it may also be square. In the example of FIGS. 2A and 2B, the shape of the substrate of the array antenna 32g is square, but it may also be a regular hexagon. In this specification, the array antennas 32a to 32g may be collectively referred to as an array antenna 32.

Another array antenna 32 may be arranged on the regular hexagonal top surface (substantially horizontal surface far from the ground surface) of the frame of the regular hexagonal prism in addition to the bottom surface. The array antenna 32 may be arranged on only one of the bottom surface or the top surface. Alternately, no array antenna may be arranged on the bottom surface and the top surface. The installation of the array antenna 32 on the bottom surface and/or the top surface can also be determined in view of the required communication area size, communication quality, communication capacity, and the like.

FIGS. 3A and 3B show another example of a service link antenna device 36. FIG. 3A is a perspective view of the antenna 36, and FIG. 3B shows a state in which the antenna 36 of FIG. 3A is developed on a plane.

As shown in FIG. 3A, an n-dimensional pyramid (n is a positive integer 3 or greater, here a regular hexagonal pyramid) is along a substantially vertical direction with its apices being oriented towards the ground surface. A frame is composed of a root portion of the regular hexagonal pyramid where a tip portion is cut off. The six array antennas 32a to 32f are arranged respectively on the outer surfaces of the six side surfaces of the frame. That is, in the example of FIGS. 2A and 2B, the array antennas 32a to 32f are along the substantially vertical direction, and the beam patterns are irradiated in the horizontal direction, whereas in the example of FIGS. 3A and 3B, the array antennas 32a to 32f are inclined with respect to the vertical direction, and the beam patterns are irradiated slightly downwards. The inclination angle from the vertical direction can be determined in view of the positional relationship between the relay device 13 and the cells 16*a*, 16*b*, . . . , the required communication area size, communication quality, communication capacity, and the like. The inclination angle is an arbitrary angle greater than 0 degrees (vertical direction) and less than 90 degrees (horizontal direction). The service link antenna device 36 may have a shape in which FIG. 3A is turned upside down.

In the example of FIGS. 3A and 3B, the shape of the substrate of the array antennas 32*a* to 32*f* is rectangular, but it may also be square or trapezoidal. The array antenna 32*g* is also arranged on the bottom surface of the regular hexagon of the frame. In the example of FIGS. 3A and 3B, the shape of the substrate of the array antenna 32*g* is square, but it may also be a regular hexagon. Furthermore, the shape of the frame may be an n-dimensional pyramid, and it is not limited to a regular n-dimensional pyramid.

Similarly to the example of FIGS. 2A and 2B in the example of FIGS. 3A and 3B, the array antennas may be arranged on the top surface (substantially horizontal surface far from the ground surface) of the frame in addition to the bottom surface. The array antenna may be arranged on only one of the bottom surface or the top surface. Alternately, no array antenna may be arranged on the bottom surface and the top surface.

Figure 4:
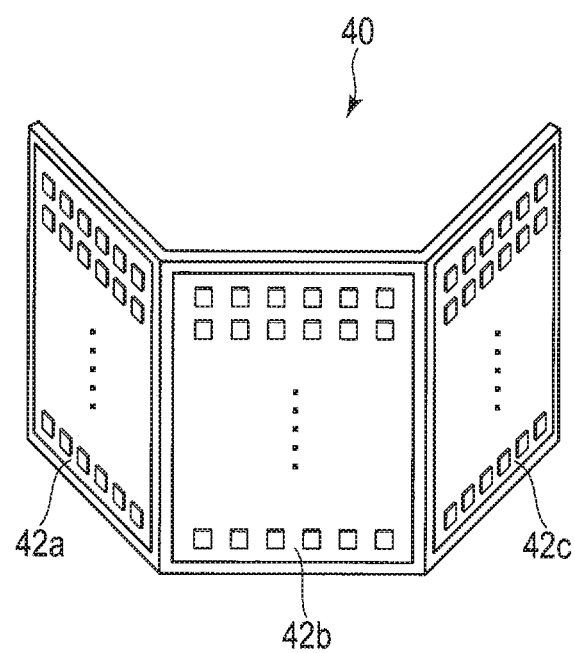
FIG. 4 is a diagram showing an example of a feeder link antenna device.

FIG. 4 shows an example of a feeder link antenna device 40. When forming beam patterns in the range of 360 degrees, the service link antenna device 34 is formed of array antennas covering the range of 360 degrees. However, in the case where there is only one base station device 14, the feeder link antenna device 40 that forms one beam pattern only in a specific direction may be formed of a single array antenna. In the embodiment, the feeder link antenna device 40 may be formed of array antennas (three antennas in this example) 42*a*, 42*b*, and 42*c*. The array antennas 42*a*, 42*b*, and 42*c* have different orientations from one another so that the feeder link can be formed even if the balloon 12 rotates about the vertical axis. The angle formed of two adjacent array antennas in the array antennas 42*a* to 42*c* is an arbitrary angle greater than 90 degrees and less than 180 degrees. The angle defined by the array antennas 42*a* and 42*b* and the angle defined by the array antennas 42*b* and 42*c* may be equal or may be different. In this specification, the array antennas 42*a* to 42*c* may be collectively referred to as an array antenna 42. Similar to the array antenna 32, the array antenna 42 includes a substrate and square antenna elements arranged on the substrate in a two-dimensional array.

The inclination angle defined by the array antennas 42*a* and 42*b* and the inclination angles defined by the array antennas 42*b* and 42*c* may be equal or may be different. The arrangement direction of the array antenna 42 may be along the vertical direction or may be inclined. The arrangement of the array antenna 42 can be determined in view of the positional relationship between the relay device 13 and the base station device 14, and the required communication area size, communication quality, communication capacity, and the like. In the example of FIG. 4, the shape of the substrate of the array antenna 42 is rectangular, but it may also be square.

While the single array antenna 32 or 42 is formed on the single substrate, a single substrate may be divided into sub-substrates, a sub-array antenna may be formed on each of the sub-substrates, and the single array antenna 32 or 42 may be formed of the sub-array antennas.

Figures 5A, 5B:
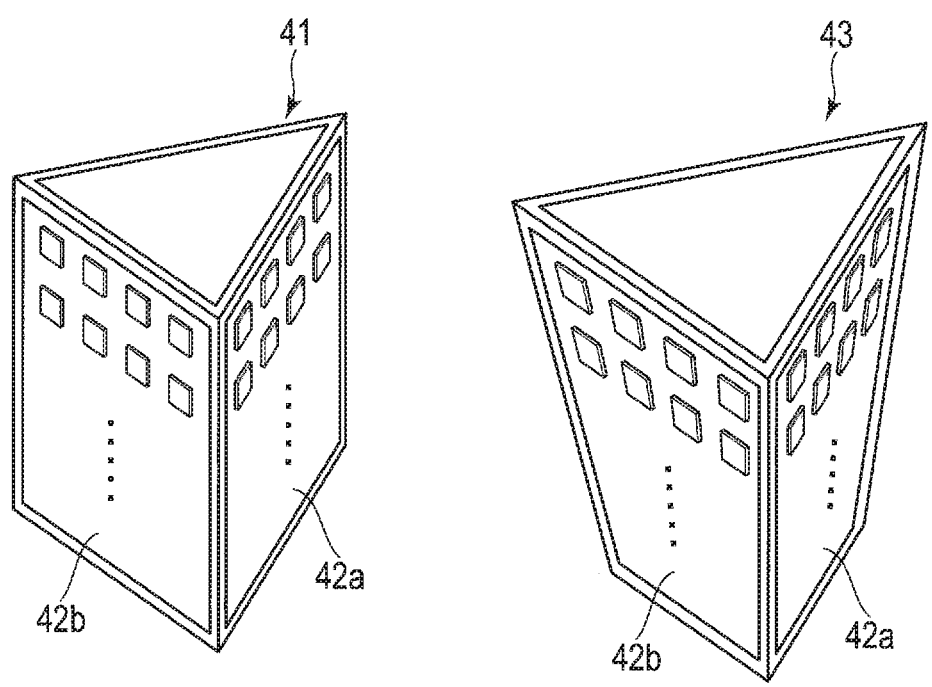
FIGS. 5A and 5B are diagrams showing another example of the feeder link antenna device.

FIGS. 5A and 5B show another example of the feeder link antenna device. The example of FIGS. 5A and 5B shows the feeder link antenna device that forms feeder link beam patterns in the range of 360 degrees similarly to the service link antenna device 34 or 36. Similarly to the service link antenna device 34 shown in FIGS. 2A and 2B, a feeder link antenna device 41 shown in FIG. 5A includes the three array antennas 42*a* to 42*c*. The three array antennas 42*a* to 42*c* are arranged respectively on the outer surfaces of three side surfaces of the frame of the n-dimensional prism (here n=3). Similarly to the service link antenna device 36 shown in FIGS. 3A and 3B, a feeder link antenna device 43 shown in FIG. 5B includes the three array antennas 42*a* to 42*c*. The three array antennas 42*a* to 42*c* are arranged respectively on the outer surfaces of the three side surfaces of the frame of the n-dimensional pyramid (here n=3).

Also in FIGS. 5A and 5B, it is possible to determine the number "n" in view of the required communication area size, communication quality, communication capacity, and the like. The shape of the substrate of the array antennas 42*a* to 42*c* is rectangular, but it may also be square. In view of the required communication area size, communication quality, communication capacity, and the like, another array antenna 42 may also be arranged on the bottom surface or the top surface. Note that the antenna 43 of FIG. 5B may be turned upside down.

Figure 6A:
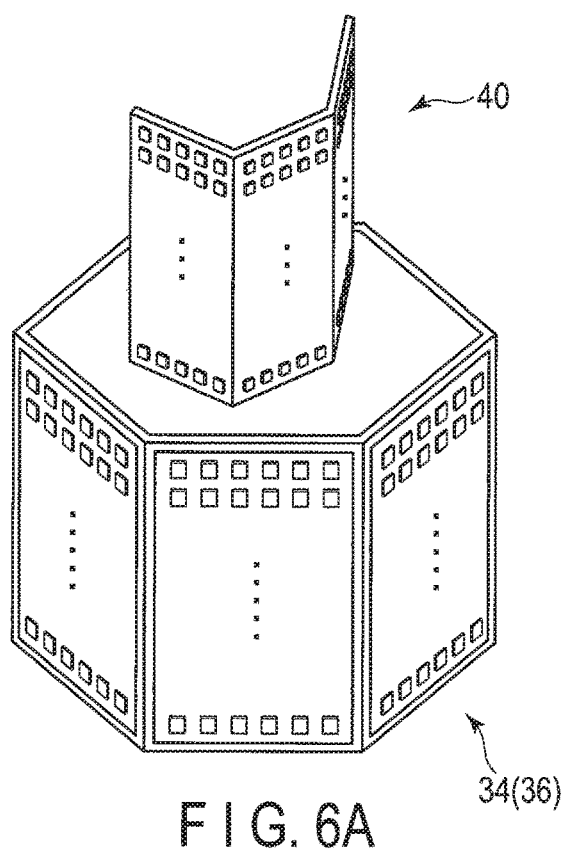
FIGS. 6A and 6B are diagrams showing an example of arrangement of the service link antenna device and the feeder link antenna device.
Figure 6B:
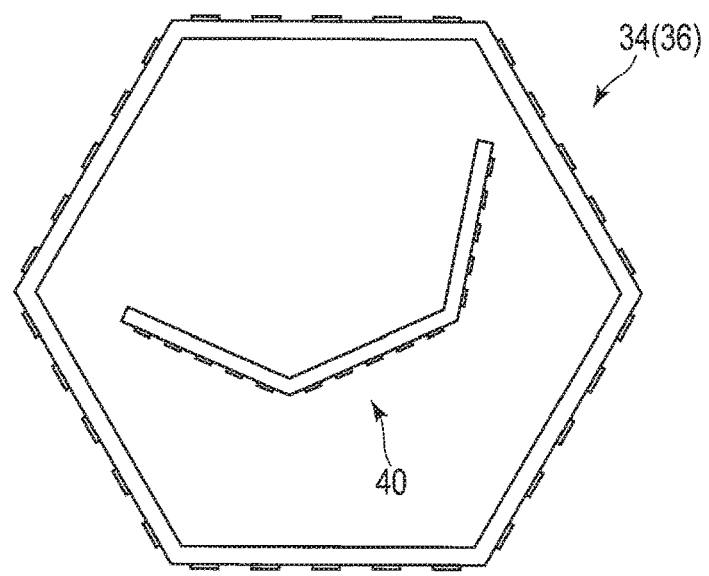

FIGS. 6A and 6B show an example of the arrangement relationship between the service link antenna device 34 or 36 and the feeder link antenna device 40 (or 41 or 43). FIG. 6A is a perspective view, and FIG. 6B is a plan view of FIG. 6A as viewed from above. When the relay device 13 is above the cell 16, the service link antenna device 34 or 36 forms downward beam patterns, and thus the feeder link antenna device 40 (or 41 or 43) is arranged on the top surface of the service link antenna device 34 or 36. In this case, in the service link antenna device 34 or 36, the array antenna is not arranged on the top surface but the array antenna is arranged on the bottom surface.

Depending on the positional relationship between the cell 16 and the relay device 13, the feeder link antenna device 40 (or 41 or 43) may be arranged on the bottom surface of the service link antenna device 34 or 36. Furthermore, the service link antenna device 34 or 36 and the feeder link antenna device 40 (or 41 or 43) may be arranged at substantially the same height.

As shown in FIGS. 2A and 2B and FIGS. 3A and 3B, the substrates of two adjacent array antennas in the array antennas 32 forming the service link antenna device 34 or 36 have different orientations from each other. As shown in FIG. 4, the substrates of the array antennas 42 forming the feeder link antenna device 40 (or 41 or 43) have different orientations from one another. As shown in FIG. 6B, the respective substrates of the array antennas forming the service link antenna device 34 or 36 have different orientations from the substrates of the array antennas forming the feeder link antenna device 40 (or 41 or 43). The respective substrates of the array antennas forming the feeder link antenna device 40 (or 41 or 43) have different orientations from the substrates of the array antennas forming the service link antenna device 34 or 36.

The configuration example of the service link antenna device 34 or 36 and the feeder link antenna device 40, 41, or 43 is not limited to the above description. In the above description, the service link antenna device 34 or 36 is formed by arranging the array antennas on the side surfaces of the frame of the n-dimensional prism or the n-dimensional pyramid. Another array antenna is also arranged on the bottom surface and/or the top surface of the frame of the n-dimensional prism or the n-dimensional pyramid as necessary. The feeder link antenna device 40, 41, or 43 is formed by arranging the array antennas so that their substrates have different orientations. However, the service link antenna devices and the feeder link antenna devices may be reversed. That is, the feeder link antenna device 40, 41, or 43 may be formed by arranging the array antennas on the side surfaces of the frame of the n-dimensional prism or the n-dimensional pyramid. Another array antenna is also arranged on the bottom surface and/or the top surface of the frame of the n-dimensional prism or the n-dimensional pyramid as necessary. The service link antenna device 34 or 36 may be formed by arranging the array antennas so that their substrates have different orientations from one another.

Note that an antenna that are not arranged on the frame of the n-dimensional prism or the n-dimensional pyramid may be formed of array antennas other than the array antennas in which the substrates have different orientations from one another. For example, both the service link antenna device and the feeder link antenna device may be formed by arranging the array antennas on the side surfaces of the frame of the n-dimensional prism or the n-dimensional pyramid. Another array antenna may also be arranged on the bottom surface and/or the top surface of the frame as necessary.

FIGS. 7A and 7B show an example of the arrangement relationship between the service link antenna device 34 or 36 and a feeder link antenna device 44. FIG. 7A is a perspective view, and FIG. 7B is a cross-sectional view of FIG. 7A as viewed from the side. The frame of the hexagonal prism or the hexagonal pyramid of the service link antenna device 34 or 36 shown in FIGS. 2A and 2B or FIGS. 3A and 3B is extended downwards. When extended, the inclination angle of the side surfaces with respect to the vertical direction is slightly increased, and the side surfaces are slightly brought closer to the horizontal direction. Array antennas 42a to 42f forming the feeder link antenna device 44 are arranged respectively on the outer side surfaces of the frame of the extended portion. Therefore, any of the substrates of the array antennas 32a to 32f forming the service link antenna device 34 or 36 has a different orientation from any of the substrates of the array antennas 42a to 42f forming the feeder link antenna device 44. The array antenna 32g of the service link antenna device 34 or 36 is arranged on the outer bottom surface of the frame of the extended portion.

Figure 8A:
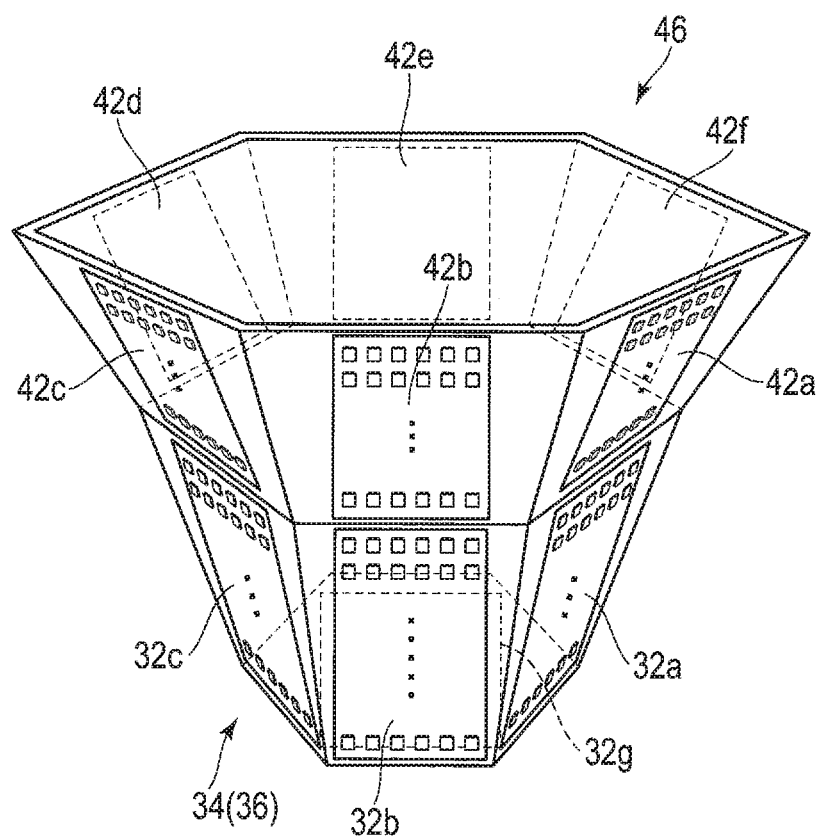
FIGS. 8A and 8B are diagrams showing yet another example of arrangement of the service link antenna device and the feeder link antenna device.
Figure 8B:
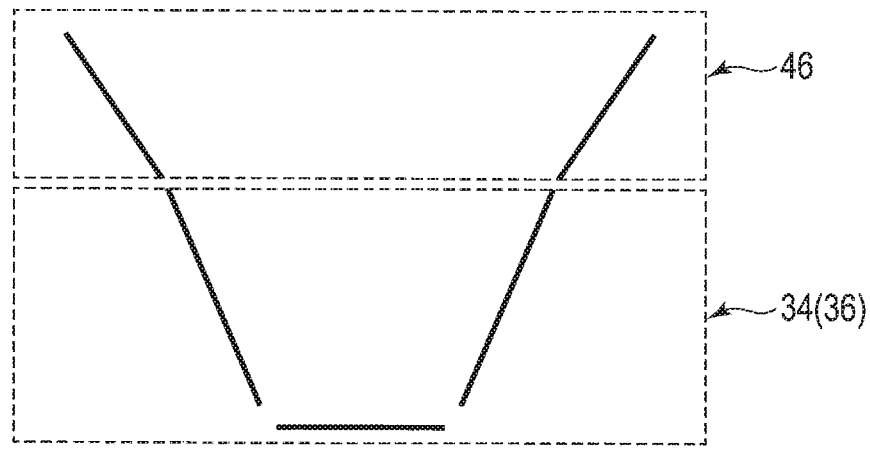

FIGS. 8A and 8B show an example of the arrangement relationship between the service link antenna device 34 or 36 and a feeder link antenna device 46. FIG. 8A is a perspective view, and FIG. 8B is a cross-sectional view of FIG. 8A as viewed from the side. The frame of the hexagonal prism or the hexagonal pyramid of the service link antenna device 34 or 36 shown in FIGS. 2A and 2B or FIGS. 3A and 3B is extended upwards. When extended, the inclination angle of the side surface with respect to the vertical direction is slightly increased, and the side surfaces are slightly brought closer to the horizontal direction. The array antennas 42a to 42f forming the feeder link antenna device 46 are arranged respectively on the outer side surfaces of the frame of the extended portion. The array antenna 32g forming the service link antenna device 34 or 36 is arranged on the outer bottom surface of the frame. Therefore, any of the substrates of the array antennas 32a to 32f forming the service link antenna device 34 or 36 has a different orientation from any of the substrates of the array antennas 42a to 42f forming the feeder link antenna device 46.

Furthermore, while the service link antenna device and the feeder link antenna device are achieved by the separate antennas devices in the above description, the service link antenna device 34 shown in FIGS. 2A and 2B or the service link antenna device 36 shown in FIGS. 3A and 3B may be shared by the service link antenna device and the feeder link antenna device. Alternately, the feeder link antenna device 40 shown in FIG. 4, the feeder link antenna device 41 shown in FIG. 5A, or the feeder link antenna device 43 shown in FIG. 5B may be shared by the service link antenna device and the feeder link antenna device.

Furthermore, while both the service link antenna device and the feeder link antenna device are formed of the array antennas, at least one of the service link antenna device or the feeder link antenna device may be formed of a single array antenna.

FIG. 9 is a block diagram showing an example of the relay device 13. The array antennas 42a to 42c forming the feeder link antenna device 40, 41, 43, 44, or 46 are connected to first wireless communication devices 54a to 54c, respectively. In this specification, the first wireless communication devices 54a to 54c may be collectively referred to as a first wireless communication device 54. The array antennas 32a to 32g forming the service link antenna device 34 or 36 are connected to second wireless communication devices 52a to 52g, respectively. In this specification, the second wireless communication devices 52a to 52g may be collectively referred to as a second wireless communication device 52.

The first wireless communication device 54 and the second wireless communication device 52 require different electromagnetic wave powers. The electromagnetic wave power required for the second wireless communication device 52 is set larger than the electromagnetic wave power required for the first wireless communication device 54. For this reason, the second wireless communication device 52 generates more heat than the first wireless communication device 54. The electromagnetic wave power may be the maximum transmission power that each wireless communication device can transmit, a set value of transmission power assumed in normal use, or an estimated value of an average value of transmission power assumed in actual use.

The first wireless communication device 54 and the second wireless communication device 52 are connected to each other via a repeater 56. A signal received by any of the first wireless communication devices 54a to 54c is input to any of the second wireless communication devices 52a to 52g via the repeater 56. The signal from the first wireless communication device 54 to the repeater 56 may be a signal before demodulation in the first wireless communication device 54 or a signal after demodulation. Similarly, a signal received by any of the second wireless communication devices 52a to 52g is input to any of the first wireless communication devices 54a to 54c via the repeater 56. The signal from the second wireless communication device 52 to the repeater 56 may be a signal before demodulation in the second wireless communication device 52 or a signal after demodulation. Thus, the signal received by one of the first wireless communication device 54 or the second wireless communication device 52 is transmitted from the other of the first wireless communication device 54 and the second wireless communication device 52.

Thus, the first wireless communication device 54 and the second wireless communication device 52 are physically connected to each other via a signal transmission conductor. Therefore, heat can be conducted between the first wireless communication device 54 and the second wireless communication device 52 via the signal transmission conductor, and heat generated by the second wireless communication device is conducted to the first wireless communication device.

In FIG. 9, both the feeder link antenna device 40, 41, 43, 44, or 46 and the service link antenna device 34 or 36 are formed of the array antennas. Hence the wireless communication devices 54 and 52 are provided in accordance with the number of the array antennas. However, as mentioned above, the number of corresponding wireless communication devices becomes singular in a case where at least one of the feeder link antenna device 40, 41, 43, 44, or 46 and the service link antenna device 34 or 36 is formed of a single array antenna.

FIG. 10 is a block diagram of an example of the first wireless communication device 54 and the second wireless communication device 52. As described above, the first wireless communication device 54 and the second wireless communication device 52 have the same basic configuration, although they are different in an electromagnetic wave power and a frequency. A single wireless communication device is connected to a single array antenna. The wireless communication device may include two baseband processing unit (referred to as BB units) 62-1, 62-2, and radio processing units (referred to as RF units) 64-1, 64-2, . . . . In this specification, the BB units 62-1, 62-2 may be collectively referred to as a BB unit 62 and the RF units 64-1, 64-2, . . . may be collectively referred to as an RF unit 64. The BB unit 62 is a digital processing circuit, and signal processing is performed by a processor or an FPGA (Field Programmable Gate Array). The BB unit 62 is connected to the repeater 56. Although not illustrated, not the BB unit 62 but the RF unit 64 may be connected to the repeater 56.

The BB unit 62 includes a transmission unit and a reception unit. The transmission unit includes a modulator 72 that modulates transmission data, and a D/A converter (referred to as a DAC) 74 that performs D/A conversion of output data of the modulator 72. The DAC 74 supplies the converted analog transmission signal to the RF units 64-1, 64-2, . . . . The first BB unit 62-1 is connected to all the RF units 64-1, 64-2, . . . and the second BB unit 62-2 is connected to specific RF units 64-1, 64-2, . . . .

The reason why the two BB units 62-1, 62-2 are provided is to form two beam patterns. A first beam pattern is formed by using all the antenna elements 68-1, 68-2, . . . of one array antenna. A second beam pattern is formed by using specific antenna elements 68-1, 68-2, . . . of a first array antenna and specific antenna elements 68-1, 68-2, . . . of a second array antenna. The second beam pattern is called a combined beam pattern. The first BB unit 62-1 processes a first signal for the first beam pattern and the second BB unit 62-2 processes a second signal for the combined beam pattern. All the antenna elements 68-1, 68-2, . . . of the array antenna are connected to all the RF units 64-1, 64-2, . . . . The specific antenna elements 68-1, 68-2, . . . are connected to specific RF units 64-1, 64-2, . . . connected to the second BB unit 62-2. Signals from the first BB unit 62-1 are supplied to all the antenna elements 68-1, 68-2, . . . through all the RF units 64-1, 64-2, . . . . Signals from the second BB unit 62-2 are supplied to the specific antenna elements 68-1, 68-2, . . . through specific RF units 64-1, 64-2, . . . .

The BB unit 62 is connected to the repeater 56. Though not shown, the RF unit 64 is connected to the repeater 56 instead of the BB unit 62.

A reception unit of the first BB unit 62-1 includes an A/D converter (referred to as an ADC) 96 that performs A/D conversion of analog reception signals from the RF units 64-1, 64-2, . . . , and a demodulator 98 that demodulates output data of the ADC 96. A reception unit of the second BB unit 62-2 includes an A/D converter (referred to as an ADC) 96 that performs A/D conversion of analog reception signals from the specific RF units 64-1, 64-2, . . . , and a demodulator 98 that demodulates output data of the ADC 96. The first BB unit 62-1 processes the first signal to be received by the first beam pattern. The second BB unit 62-2 processes the second signal to be received by the combined beam pattern.

The RF units 64-1, 64-2, . . . are connected to the antenna elements 68-1, 68-2, . . . via selectors 66-1, 66-2, . . . , respectively. The antenna elements 68-1, 68-2 forms the array antenna 32 or 42. In this specification, the antenna elements 68-1, 68-2, . . . may be collectively referred to as an antenna element 68. The selectors 66-1, 66-2, . . . may be collectively referred to as a selector 66. The transmission signal from the BB unit 62 is input to a filter 76. The transmission signal passed through the filter 76 is converted to a radio frequency signal (RF signal) by an up-converter 78. The RF signal from the up-converter 78 is input to a phase shifter 80, and its phase is shifted. The RF signal from the phase shifter 80 is input to an amplifier 82, and its amplitude is adjusted. The RF signal from the amplifier 82 is input to a first terminal of the selector 66 as an output of the RF unit 64. The first BB unit 62-1 processes the first signal to be transmitted by the first beam pattern. The second BB unit 62-2 processes the second signal to be transmitted by the combined beam pattern.

The RF signal input to the first terminal of the selector 66 is irradiated from the antenna element 68 as an electromagnetic wave. The phase shift amount of the phase shifter 80 and the amplification factor of the amplifier 82 are controlled by a beam forming control unit 69. By adjusting the phase shift amount of the phase shifter 80 and the amplification factor of the amplifier 82, the electromagnetic wave to be irradiated from the array antenna 32 or 42 can be formed into a beam pattern (beam forming) having directivity in a specific direction.

The RF signal received by the array antenna 32 or 42 is from a second terminal of the selector 66 and input to an amplifier 88, and thus its amplitude is adjusted. The amplification factor of the amplifier 88 corresponds to the amplification factor of the amplifier 82. The RF signal from the amplifier 88 is input to a phase shifter 90, and its phase is shifted. The phase shift amount of the phase shifter 90 also corresponds to the phase shift amount of the phase shifter 80. The phase shift amount of the phase shifter 90 and the amplification factor of the amplifier 88 are also controlled by the beam forming control unit 69. By adjusting the phase shift amount of the phase shifter 90 and the amplification factor of the amplifier 88, the electromagnetic wave received by the array antenna 32 or 42 can be formed into a beam pattern having directivity in a specific direction.

The RF signal from the phase shifter 90 is input to a down-converter 92 and converted to the frequency of the baseband signal. The baseband signal from the down-converter 92 is input to the BB unit 62 as an output of the RF unit 64 via a filter 94.

In the wireless communication device of FIG. 10, the baseband signal from the BB unit 62 of the wireless communication device of the reception side is input to the BB unit 62 of the wireless communication device of the transmission side via the repeater 56. However, instead of this, the baseband signal from the RF unit 64 of the wireless communication device of the reception side may be input to the RF unit 64 of the wireless communication device of the transmission side via the repeater 56. Furthermore, instead of relaying the baseband signal, the RF signal may also be relayed. For example, the RF signal from the phase shifter 90 in the RF unit 64 of the wireless communication device of the reception side may be input to the phase shifter 80 in the RF unit 64 of the wireless communication device of the transmission side via the repeater 56.

The radio frequency of the up-converter 78 and the down-converter 92 of the first wireless communication device 54 is set higher than the radio frequency of the up-converter 78 and the down-converter 92 of the second wireless communication device 52. The power of the amplifiers 82 and 88 of the second wireless communication device 52 is set larger than the power of the amplifiers 82 and 88 of the first wireless communication device 54.

In the wireless communication device of FIG. 10, the baseband signal from the BB unit 62 of the wireless communication device of the reception side is input to the BB unit 62 of the wireless communication device of the transmission side via the repeater 56. However, instead of this, the baseband signal from the RF unit 64 of the wireless communication device of the reception side may be input to the RF unit 64 of the wireless communication device of the transmission side via the repeater 56. Furthermore, instead of relaying the baseband signal, the RF signal may also be relayed. For example, the RF signal from the phase shifter 90 in the RF unit 64 of the wireless communication device of the reception side may be input to the phase shifter 80 in the RF unit 64 of the wireless communication device of the transmission side via the repeater 56.

The radio frequency of the up-converter 78 and the down-converter 92 of the first wireless communication device 54 is set higher than the radio frequency of the up-converter 78 and the down-converter 92 of the second wireless communication device 52. The power of the amplifiers 82 and 88 of the second wireless communication device 52 is set larger than the power of the amplifiers 82 and 88 of the first wireless communication device 54.

FIG. 11 is a block diagram of another example of the first wireless communication device 54 and the second wireless communication device 52. In the example of FIG. 10, the phase shifter 80 is connected between the amplifier 82 and the up-converter 78 and the phase shifter 90 is connected between the amplifier 88 and the down-converter 92 in the RF unit 64. However, in the example of FIG. 11, the RF unit 64 does not include the phase shifters 80 and 90. The output of the up-converter 78 in the RF unit 64 is input to the amplifier 82. The output of the amplifier 88 is input to the down-converter 92. The BB units 62-1, 62-2, . . . are connected to the RF units 64-1, 64-2, . . . , respectively. In this specification, the BB units 62-1, 62-2, . . . may be collectively referred to as the BB unit 62. The transmission unit of the BB unit 62 includes a weight multiplication processor 73 and the DAC 74. The reception unit of the BB unit 62 includes the ADC 96 and a weight multiplication processor 97. A control signal from the beam forming control unit 69 is supplied to the BB unit 62. The weight multiplication processors 73 and 97 digitally adjust the amplitude and phase of the signal in accordance with the control signal from the beam forming control unit 69. Thus, the beam forming processing is digitally executed.

First modulator/demodulator 60-1 including the modulator 72 and the demodulator 98 is connected to all the BB units 62-1, 62-2, . . . . Second modulator/demodulator 60-2 including the modulator 72 and the demodulator 98 is connected to specific BB units 62-1, 62-2, . . . . The first modulator/demodulator 60-1 processes the first signal for the first beam pattern. The second modulator/demodulator 60-2 processes the second signal for the combined beam pattern. All the antenna elements 68-1, 68-2, . . . of the array antenna 32 or 42 are connected to all the BB units 62-1, 62-2, . . . via the RF units 64-1, 64-2, . . . , respectively. The specific antenna elements 68-1, 68-2, . . . are connected to the second modulator/demodulator 60-2 via the specific RF units 64-1, 64-2, . . . and the specific BB units 62-1, 62-2, . . . , respectively.

FIG. 12 is a block diagram of yet another example of the first wireless communication device 54 and the second wireless communication device 52. In the example shown in FIG. 10, the RF unit 64 is provided for each antenna element 68. However, the RF unit 64 may be divided into two parts. For example, as shown in FIG. 12, first RF units 64a-1, 64a-2, . . . may be formed of the amplifiers 82, 88 and the phase shifters 80 and 90, and a second RF units 64b may be formed of the filters 76 and 94, the up-converters 78, and the down-converters 92. In this specification, the first RF units 64a-1, 64a-2, . . . may be collectively referred to as a first RF unit 64a and the second RF units 64b-1, 64b-2, . . . may be collectively referred to as a second RF unit 64b.

The first RF units 64a-1, 64a-2, . . . are respectively provided for the antenna elements 68-1, 68-2, . . . , and the second RF units 64b-1, 64b-2, . . . are respectively provided for the antenna elements 68-1, 68-2, . . . . The second RF units 64b-1, 64b-2, . . . are respectively connected to the BB units 62-1, 62-2, . . . . The RF signal from the second RF unit 64b is input to the first RF unit 64a. The RF signal from the first RF unit 64a is input to the second RF unit 64b.

Figure 13:
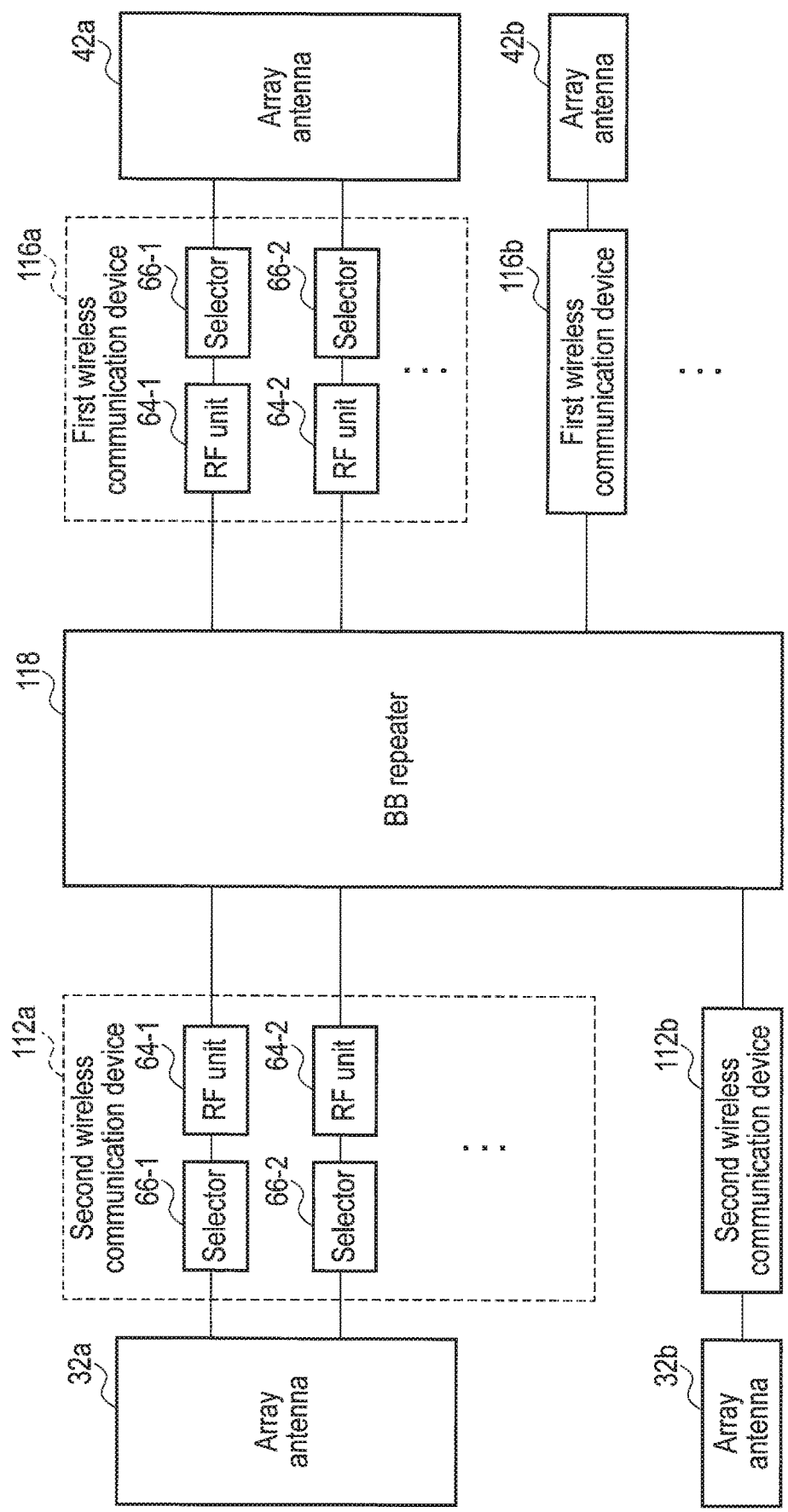
FIG. 13 is a block diagram showing still another example of the wireless communication device.

FIG. 13 is a block diagram of yet another example of the first wireless communication device 54 and the second wireless communication device 52. In the examples shown in FIGS. 10 to 12, the single repeater 56 is provided for the relay device 13, and the BB units 62 are provided for the wireless communication devices 52 and 54, respectively. In the example of FIG. 13, a single BB repeater 118 formed of the processor or the FPGA is provided for the wireless communication devices 52 and 54. First wireless communication devices 116a, 116b, . . . . Second wireless communication devices 112a, 112b, . . . are connected to the BB repeater 118. In this specification, the first wireless communication devices 116a, 116b, . . . may be collectively referred to as a first wireless communication device 116. The second wireless communication devices 112a, 112b, . . . may be collectively referred to as a second wireless communication device 112.

The BB repeater 118 is an integration of the BB unit 62 and the repeater 56 of FIG. 10. The first wireless communication device 116 and the second wireless communication device 112 include the selector 66 and the RF unit 64 of FIG. 10. Alternatively, the BB repeater 118 is an integration of the second RF unit 64b, the BB unit 62, and the repeater 56 of FIG. 12. The first wireless communication device 116 and the second wireless communication device 112 may include the selector 66 and the first RF unit 64a of FIG. 12.

The BB repeater 118 of FIG. 13 may be divided into several sub-BB repeaters, and the several sub-BB repeaters 118 may be provided for first wireless communication devices 116 and second wireless communication devices 112.

An example of beam forming will be described. In conventional beam forming, the direction in which an electromagnetic wave is mainly irradiated from one array antenna, i.e., the beam pattern, is changed by inputting the same signal with different phases and amplitudes to antenna elements of one array antenna. In the embodiment, as conventional, the first beam pattern is formed by using the antenna elements of the first array antenna and the second beam pattern is formed by using the antenna elements of the second array antenna. In the embodiment, the combined beam pattern is further formed by inputting the same signal with different phases and amplitudes to some of the antenna elements of the first array antenna and some of the antenna elements of the second array antenna. That is, a third array antenna is formed of some of the antenna elements of the first array antenna and some of the antenna elements of the second array antenna. Therefore, the combined beam pattern can be formed by the third array antenna in a direction greatly shifted from the direction orthogonal to the substrates of the first and second array antennas, and various beam patterns can be formed by a small number of array antennas.

Figure 14A:
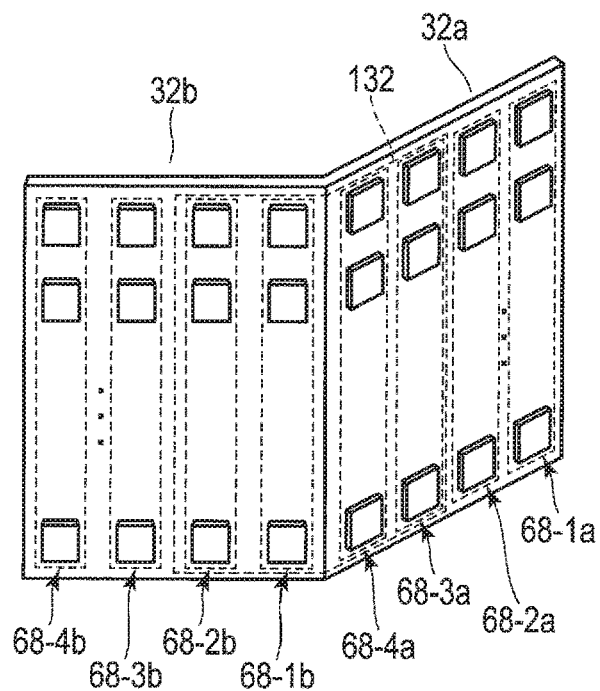
FIGS. 14A and 14B are diagrams showing an example of a combined beam pattern.
Figure 14B:
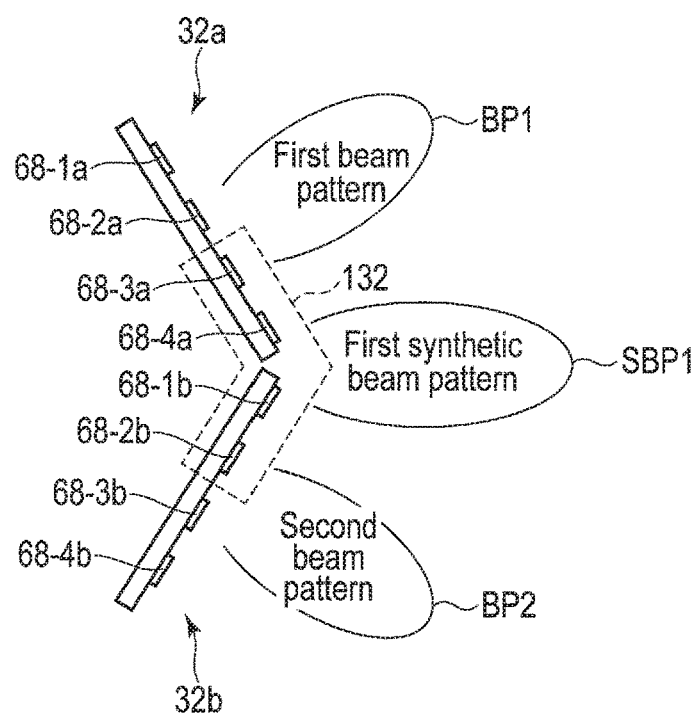

An example of combined beam forming is shown. The beam forming of the embodiment is to form a combined beam pattern by the two array antennas. As an example, FIGS. 14A and 14B show an example of the combined beam pattern formed by the adjacent array antennas 32a and 32b in the array antennas 32a to 32f forming the service link antenna 34 or 36. However, the two array antennas for combined beam forming are not limited to them. Any two array antennas in the array antennas 32a to 32f forming the service link antenna 34 or 36 may form the combined beam pattern. Any two array antennas in the array antennas 42a to 42c forming the feeder link antenna 40 may form the combined beam pattern.

As shown in FIG. 14A, each of the array antennas 32a and 32b includes the antenna element 68 arranged on the substrate in a two-dimensional matrix. The array antenna 32a includes antenna element columns 68-1a, 68-2a, 68-3a, and 68-4a. The array antenna 32b includes antenna element columns 68-1b, 68-2b, 68-3b, and 68-4b. In FIG. 14A, the array antennas 32a and 32b are arranged on the surfaces of the hexagonal prism as shown in FIGS. 2A and 2B or the hexagonal pyramid as shown in FIGS. 3A and 3B. Thus, the antenna element column 68-4a at the left end of the array antenna 32a is near the antenna element column 68-1b at the right end of the array antenna 32b. The orientations of the substrate of the array antenna 32a and the substrate of the array antenna 32b are not parallel and different. The angle defined by the both substrates is about 120 degrees. This angle is not limited thereto, and may be any angle larger than 90 degrees and smaller than 180 degrees.

The wireless communication device 52 or 54 as shown in FIGS. 10 to 13 is connected to the array antennas 32a and 32b. Regarding the array antenna 32a, the first signal from the first BB unit 62-1 is supplied to all the antenna elements 68 of all the antenna element columns 68-1a, 68-2a, 68-3a, and 68-4a via all the RF units 64. The phase of the first signal supplied to each antenna element 68 is adjusted in the phase shifter 80 based on the control signal from the beam forming control unit 69. Furthermore, the amplitude of the first signal of which phase has been adjusted is adjusted in the amplifier 82 based on the control signal from the beam forming control unit 69. Due to this, as shown in FIG. 14B, a first beam pattern BP1 is formed in a direction orthogonal to the substrate of the array antenna 32a. Similarly, at the time of reception, the amplitude and phase of a first reception signal are adjusted in the RF unit 64, and the first reception signal is then input to the first BB unit 62-1.

Also regarding the array antenna 32b, similarly, the first signal from the first BB unit 62-1 is supplied to all the antenna elements 68 of all the antenna element columns 68-1b, 68-2b, 68-3b, and 68-4b via all the RF units 64. As shown in FIG. 14B, a second beam pattern BP2 is formed in a direction orthogonal to the substrate of the array antenna 32b. Also at the time of reception, the first reception signal is input to the first BB unit 62 via the RF unit 64.

The antenna element columns 68-1b, 68-2b, 68-3b, and 68-4b of the array antenna 32b are arranged in a direction away from the array antenna 32a. The antenna element columns 68-4a, 68-3a, 68-2a, and 68-1a of the array antenna 32a are arranged in a direction away from the array antenna 32b. An antenna element group 132 is formed of at least one of the antenna element columns 68-4a, 68-3a, 68-2a, and 68-1a of the array antenna 32a near the array antenna 32b and at least one of the antenna element columns 68-1b, 68-2b, 68-3b, and 68-4b of the array antenna 32b near the array antenna 32a. For example, two antenna element columns 68-1b and 68-2b of the array antenna 32b and two antenna element columns 68-4a and 68-3a of the array antenna 32a constitute the antenna element group 132. The antenna element group 132 is constituted by half of antenna element columns of the array antenna 32a and half of antenna element columns of the array antenna 32b. Therefore, the number of antenna elements forming the antenna element group 132 is the same as the number of antenna elements forming the array antenna 32a and the number of antenna elements forming the array antenna 32b. For this reason, the antenna element group 132 can function as an array antenna equivalent to the array antennas 32a and 32b. The second signal from the second BB unit 62-2 of the wireless communication device is input to each antenna element of the antenna element group 132. The second signal received by each antenna element of the antenna element group 132 is input to the second BB unit 62-2 of the wireless communication device.

As described above, of the antenna elements of the array antenna, antenna elements having a short distance from the other array antenna are selected as the antenna elements used for forming the combined beam pattern. The distance between a first array antenna and an antenna element of a second array antenna is defined as follows. The positions of the antenna elements located at the outer edge in the antenna elements included in the first array antenna are connected in order to define an area. The shortest distance between the area and the antenna element of the second array antenna is the distance between the first array antenna and an antenna element of the second array antenna. As a result, the nearby antenna elements are used for forming the combined beam pattern. Hence a beam pattern with higher accuracy is formed.

Regarding the array antenna 32a, the second signal from the second BB unit 62-2 is supplied to all the antenna elements 68 of the antenna element columns 68-3a and 68-4a via the RF unit 64 after the phase and amplitude are adjusted. Regarding the array antenna 32b, the second signal from the second BB unit 62-2 is supplied to all the antenna elements 68 of the antenna element columns 68-1b and 68-2b via the RF unit 64 after the phase and amplitude are adjusted.

As a result, as shown in FIG. 14B, the direction of a first combined beam pattern SBP1 formed by the antenna element group 132 is in between the direction of the first beam pattern BP1 and the direction of the second beam pattern BP2. At the time of reception, similarly, the reception signal of the antenna element group 132 is input to the second BB unit 62-1 after its amplitude and phase are adjusted in the RF unit 64. The direction of the combined beam pattern SBP1 is determined by a phase shift amount and an amplitude adjustment amount that are adjusted by the beam forming control unit 69. Since the antenna element group 132 functions as an array antenna equivalent to the array antennas 32a and 32b, it is possible for the combined beam pattern SBP1 to have almost the same accuracy as the first and second beam patterns BP1 and BP2 formed by the array antennas 32a and 32b.

The closer to the direction orthogonal to the substrate of the array antenna 32a the first beam pattern BP1 is, the easier the formation of the first beam pattern BP1 is. Similarly, the closer to the direction orthogonal to the substrate of the array antenna 32b the direction is, the easier the formation of the second beam pattern BP2 is. These indicate that the direction between the direction orthogonal to the substrate of the array antenna 32a and the direction orthogonal to the substrate of the array antenna 32b is a direction that is relatively difficult to form in either of the first beam pattern BP1 and the second beam pattern BP2. By forming the first combined beam pattern SBP1 with respect to such direction, it becomes possible to form various beam patterns with higher accuracies.

In this manner, beam patterns in three directions can be formed by the two array antennas. According to the embodiment, the number of array antennas required to form the same number of beam patterns in different directions can be reduced as compared with the conventional example in which no combined beam pattern is formed. It is possible to form more various beam patterns with simple configurations by forming the combined beam pattern.

When forming the combined beam pattern by the antenna element group 132, if the antenna elements are too far apart, the accuracy of the beam pattern may decrease. Therefore, when configuring the antenna element group 132 by selecting some of the antenna elements forming the array antennas 32a and 32b, it is preferable to select nearby antenna elements. A beam pattern with higher accuracy can be formed by the nearby antenna elements. If the antenna elements are too close, on the other hand, the accuracy of the beam pattern may also decrease. Therefore, when installing the array antenna 32a and the array antenna 32b, it is preferable to install them such that the distance between the antenna elements of the array antenna 32a, the distance between the antenna elements of the array antenna 32b, and the distance between the antenna elements of the array antenna 32a and the antenna elements of the array antenna 32b adjacent thereto are almost the same.

The arrangement directions of the array antennas 32a and 32b are not limited to the horizontal direction shown in the example of FIGS. 14A and 14B but it may be arrayed in the vertical direction. In the latter case, the antenna element group for the combined beam pattern is constituted by not the antenna element columns but antenna element rows of the two array antennas.

FIGS. 15A and 15B show a modification of the combined beam forming of FIGS. 14A and 14B. In FIGS. 14A and 14B, the antenna element group 132 is formed of the same number of antenna element columns of the array antenna 32a and the array antenna 32b. In FIGS. 15A and 15B, the antenna element group 132 is formed of different numbers of antenna element columns of the array antenna 32a and the array antenna 32b.

In FIG. 15A, an antenna element group 132a is formed of three antenna element columns 68-4a, 68-3a, and 68-2a of the array antenna 32a near the array antenna 32b and an antenna element column 68-1b of the array antenna 32b near the array antenna 32a. The direction of the first combined beam pattern SBP1 formed by the antenna element group 132a is in between the first beam pattern BP1 and the second beam pattern BP2. The direction is near the first beam pattern BP1 and far from the second beam pattern BP2.

In FIG. 15B, on the other hand, an antenna element group 132b is formed of an antenna element column 68-4a of the array antenna 32a near the array antenna 32b and three antenna element columns 68-1b, 68-2b, and 68-3b of the array antenna 32b near the array antenna 32a. The direction of the first combined beam pattern SBP1 formed by the antenna element group 132b is in between the first beam pattern BP1 and the second beam pattern BP2. The direction is near the second beam pattern BP2 and far from the first beam pattern BP1.

Thus, by changing the ratio of the antenna elements of the array antenna 32a and the antenna elements of the array antenna 32b forming the antenna element group 132 forming the combined beam pattern, and by adjusting the direction of the combined beam pattern, it is possible to form more various beam patterns with higher accuracies.

While the above description is about an example in which a combined beam pattern is formed by two array antennas, another example will be descried with reference to FIGS. 16A and 16B. In the other example, a combined beam pattern is formed by three or more array antennas. FIGS. 16A and 16B show an example in which the combined beam pattern is formed by a certain array antenna and two array antennas on both sides thereof by adding an array antenna 32c to the antenna device shown in FIGS. 14A and 14B. The three array antennas for combined beam forming are not limited to them, but any three array antennas in the array antennas 32a to 32f forming the service link antenna 34 or 36 may be used for forming the combined beam pattern. The array antennas 42a to 42c forming the feeder link antenna 40 may also be used for forming the combined beam pattern.

As shown in FIG. 16A, the array antenna 32c includes antenna element columns 68-1c, 68-2c, 68-3c, and 68-4c. The array antenna 32c is arranged on the surface of the hexagonal prism as shown in FIGS. 2A and 2B or the hexagonal pyramid as shown in FIGS. 3A and 3B. The antenna element column 68-1c at the right end of the array antenna 32c is near the antenna element column 68-4b at the left end of the array antenna 32b. The orientations of the substrate of the array antenna 32c and the substrate of the array antenna 32b are not parallel and different. The angle defined by the both substrates is about 120 degrees. This angle is not limited thereto, and may be any angle larger than 90 degrees and smaller than 180 degrees.

The wireless communication device 52 or 54 as shown in FIGS. 10 to 13 is also connected to the array antenna 32c. Regarding the array antenna 32c, the first signal from the first BB unit 62-1 is supplied to all the antenna elements 68 of the antenna element columns 68-1c, 68-2c, 68-3c, and 68-4c via all the RF units 64.

An antenna element group 134 is formed of at least one antenna element column of the array antenna 32a near the array antenna 32b and at least one antenna element column of the array antenna 32b near the array antenna 32a. For example, two antenna element columns 68-4a and 68-3a of the array antenna 32a near the array antenna 32b and two antenna element columns 68-1b and 68-2b of the array antenna 32b near the array antenna 32a form the antenna element group 134.

An antenna element group 136 is formed of at least one antenna element column of the array antenna 32b near the array antenna 32c and at least one antenna element column of the array antenna 32c near the array antenna 32b. For example, two antenna element columns 68-4b and 68-3b of the array antenna 32b near the array antenna 32c and two antenna element columns 68-1*c* and 68-2*c* of the array antenna 32*c* near the array antenna 32*b* form the antenna element group 136.

In the wireless communication device connected to the array antenna 32*a*, the second signal from the second BB unit 62-2 is supplied to all the antenna elements 68 of the antenna element columns 68-3*a* and 68-4*a* after the phase and amplitude are adjusted. In the wireless communication device connected to the array antenna 32*b*, the second signal from the second BB unit 62-2 is supplied to all the antenna elements 68 of the antenna element columns 68-1*b* and 68-2*b* or to all the antenna elements 68 of the antenna element columns 68-3*b* and 68-4*b* after the phase and amplitude are adjusted. In the wireless communication device connected to the array antenna 32*c*, the second signal from the second BB unit 62-2 is supplied to all the antenna elements 68 of the antenna element columns 68-1*c* and 68-2*c* after the phase and amplitude are adjusted.

As shown in FIG. 16B, first, second, and third beam patterns BP1, BP2, and BP3 are formed by the array antennas 32*a*, 32*b*, and 32*c*, respectively.

When the second signal from the second BB unit 62-2 is supplied to all the antenna elements 68 of the antenna element columns 68-1*b* and 68-2*b* in the wireless communication device connected to the array antenna 32*b*, the first combined beam pattern SBP1 is formed by the antenna element group 134. On the other hand, when the second signal from the second BB unit 62-2 is supplied to all the antenna elements 68 of the antenna element columns 68-3*b* and 68-4*b* in the wireless communication device connected to the array antenna 32*b*, the second combined beam pattern SBP2 is formed by the antenna element group 136.

Half of the antenna element columns of the antenna array 32*b* forms the antenna element group 134, and the other half forms the antenna element group 136. That is, each antenna element column of the array antenna relates to only one of the combined beam patterns. For this reason, if the first, second, and third beam patterns BP1, BP2, and BP3 and whichever of the first and second combined beam patterns SBP1 and SBP2 are formed simultaneously, two BB units of the wireless communication device connected to each array antenna are sufficient, i.e., one for the beam pattern and the other for the combined beam pattern. If a certain antenna element column belongs to both of the antenna element groups 134 and 136, three BB units of the wireless communication device are necessary, i.e., for the beam pattern and for the first and second combined beam patterns.

Thus, by using the three array antennas, the three beam patterns and the two combined beam patterns can be formed. Hence various beam patterns can be formed by a small number of array antennas. Similarly to FIGS. 15A and 15B, by changing the ratio of the antenna elements of the array antennas 32*a*, 32*b*, and 32*c* forming the antenna element groups 134 and 136, the direction of the combined beam pattern can be changed. It is thus possible to form more various beam patterns.

FIG. 17 shows another example of forming a combined beam pattern using three array antennas. In FIGS. 16A and 16B, the three array antennas are arrayed one-dimensionally to form the two combined beam patterns. In FIG. 17, three array antennas are arranged two-dimensionally. An array antenna 32*x* is added above the array antennas 32*a* and 32*b* shown in FIGS. 14A and 14B. The array antennas 32*a* and 32*b* form beam patterns in the horizontal direction, and the array antenna 32*x* forms a beam pattern obliquely upwards.

An antenna element group 138 is formed of two rows and two columns of the antenna elements of the array antenna 32*a* near the array antennas 32*b* and 32*x*, two rows and two columns of the antenna elements of the array antenna 32*b* near array antennas 32*a* and 32*x*, and two rows of the antenna elements of the array antenna 32*x* near the array antennas 32*b* and 32*x*. Instead of two rows of the antenna elements of the array antenna 32*x* near the array antennas 32*b* and 32*x*, two rows and two columns of the antenna elements of the array antenna 32*x* near the array antennas 32*b* and 32*x* may be used for forming the antenna element group 138.

Figure 18A:
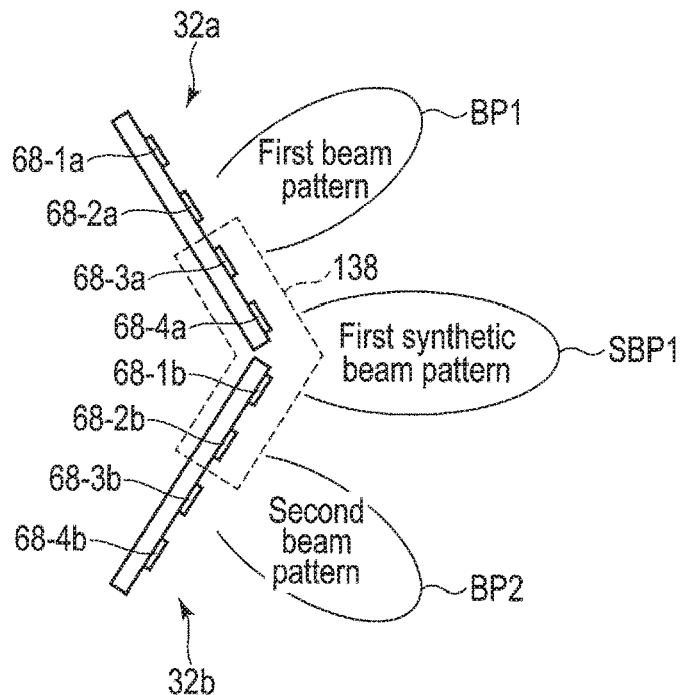
FIGS. 18A and 18B are diagrams showing still further example of a combined beam pattern.
Figure 18B:
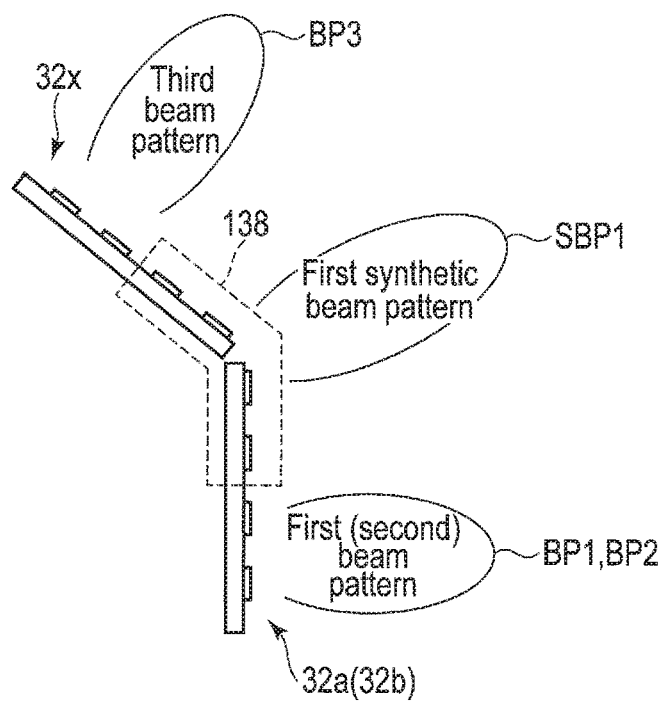

FIG. 18A is a plan view of the antenna of FIG. 17 as viewed from above. FIG. 18B is a cross-sectional view of the antenna of FIG. 17 as viewed from the side. The antenna element group 138 forms the first combined beam pattern SBP1. When viewed from above, as shown in FIG. 18A, the first combined beam pattern SBP1 is in between the first beam pattern BP1 and the second beam pattern BP2 and in the horizontal direction. When viewed from the side, as shown in FIG. 18B, the first combined beam pattern SBP1 is in between the first beam pattern BP1 (or second beam pattern BP2) and the third beam pattern SB3 and in a slightly upward direction.

Although not illustrated, in the antenna of FIG. 17, similarly to the antenna of FIGS. 14A and 14B, the array antennas 32*a* and 32*b* can form a second combined beam pattern, the array antennas 32*a* and 32*x* can form a third combined beam pattern, and the array antennas 32*b* and 32*x* can form a fourth combined beam pattern.

Use of the three array antennas as in FIG. 17 also allows various beam patterns to be formed by a small number of array antennas. Furthermore, similarly to FIGS. 15A and 15B, by changing the ratio of the antenna elements of the array antennas 32*a*, 32*b*, and 32*c* forming the antenna element groups 134 and 136, the direction of the combined beam pattern can be changed, and it is thus possible to form more various beam patterns.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:
- a first antenna comprising at least one first antenna element and at least one second antenna element on a first planar substrate;
- a second antenna comprising at least one third antenna element and at least one fourth antenna element on a second planar substrate, an orientation of the second planar substrate being different from an orientation of the first planar substrate; and
- a circuit that forms a first synthetic beam pattern using the at least one first antenna element and the at least one third antenna element,
- wherein the at least one second antenna element and the at least one fourth antenna element are not used to form the first synthetic beam pattern.

2. The electronic device of claim 1, wherein:
- the at least one first antenna element and the at least one second antenna element are arrayed in a direction away from the second antenna, the at least one first antenna element is closer to the second antenna than the at least one second antenna element, the at least one third antenna element and the at least one fourth antenna element are arrayed in a direction away from the first antenna, and the at least one third antenna element is closer to the first antenna than the at least one fourth antenna element.

3. The electronic device of claim 1, wherein:

the at least one first antenna element comprises plural first antenna elements;

the at least one second antenna element comprises plural second antenna elements;

the at least one third antenna element comprises plural third antenna elements;

the at least one fourth antenna element comprises plural fourth antenna elements;

the first antenna elements are arrayed two-dimensionally, the second antenna elements are arrayed two-dimensionally, the third antenna elements are arrayed two-dimensionally, the fourth antenna elements are arrayed two-dimensionally, the circuit forms the first synthetic beam pattern using at least one of the first antenna elements and at least one of the third antenna elements, a shortest distance between the at least one of the first antenna elements and a second area is shorter than a first distance, the second area being surrounded by a line connecting antenna elements located at an outer edge of an array of the third antenna elements and the fourth antenna elements, and a shortest distance between the at least one of the third antenna elements and a first area is shorter than the first distance, the first area being surrounded by a line connecting antenna elements located at an outer edge of an array of the first antenna elements and the second antenna elements.

4. The electronic device of claim 1, wherein:

the circuit forms:

a first beam pattern using the at least one first antenna element and the at least one second antenna element, a second beam pattern using the at least one third antenna element and the at least one fourth antenna element, and the first synthetic beam pattern using a first number of the at least one first antenna element and a second number of the at least one third antenna element, when the first number is larger than the second number, the first synthetic beam pattern is between the first beam pattern and the second beam pattern and is closer to the first beam pattern than the second beam pattern, and when the second number is larger than the first number, the first synthetic beam pattern is between the first beam pattern and the second beam pattern and is closer to the second beam pattern than the first beam pattern.

5. The electronic device of claim 1, wherein:

the at least one first antenna element comprises plural first antenna elements;

the at least one second antenna element comprises plural second antenna elements;

the at least one third antenna element comprises plural third antenna elements;

the at least one fourth antenna element comprises plural fourth antenna elements;

the first antenna elements are arrayed two-dimensionally on the first planar substrate, the second antenna elements are arrayed two-dimensionally on the first planar substrate, the third antenna elements are arrayed two-dimensionally on the second planar substrate, the fourth antenna elements are arrayed two-dimensionally on the second planar substrate, an array of the first antenna elements is closer to the second antenna than an array of the second antenna elements, and an array of the third antenna elements is closer to the first antenna than an array of the fourth antenna elements.

6. The electronic device of claim 5, wherein:

a size of the array of the first antenna elements is equal to a size of the array of the second antenna elements, and a size of the array of the third antenna elements is equal to a size of the array of the fourth antenna elements.

7. The electronic device of claim 1, further comprising:

a third antenna comprising at least one fifth antenna element and at least one sixth antenna element on a third planar substrate, an orientation of the third planar substrate being different from the orientation of the first planar substrate and the orientation of the second planar substrate, wherein the circuit forms a second synthetic beam pattern using the at least one fourth antenna element and the at least one fifth antenna element, and wherein the at least one sixth antenna element is not used to form the second synthetic beam pattern.

8. The electronic device of claim 1, further comprising:

a third antenna comprising at least one fifth antenna element and at least one sixth antenna element on a third planar substrate, an orientation of the third planar substrate being different from the orientation of the first planar substrate and the orientation of the second planar substrate, wherein the circuit forms a second synthetic beam pattern using the at least one first antenna element, the at least one third antenna element, and the at least one fifth antenna element, and wherein the at least one sixth antenna element is not used to form the second synthetic beam pattern.

9. The electronic device of claim 1, wherein the circuit forms:

a first beam pattern using the at least one first antenna element and the at least one second antenna element, and a second beam pattern using the at least one third antenna element and the at least one fourth antenna element.

10. The electronic device of claim 7, wherein the circuit forms:

a first beam pattern using the at least one first antenna element and the at least one second antenna element, a second beam pattern using the at least one third antenna element and the at least one fourth antenna element, and a third beam pattern using the at least one fifth antenna element and the at least one sixth antenna element.

11. A method for an electronic device, the electronic device comprising a first antenna comprising at least one first antenna element and at least one second antenna element on a first planar substrate, and a second antenna comprising at least one third antenna element and at least one fourth antenna element on a second planar substrate, an orientation of the second planar substrate being different from an orientation of the first planar substrate, and the method comprising:
forming a first synthetic beam pattern using the at least one first antenna element and the at least one third antenna element,
wherein the at least one second antenna element and the at least one fourth antenna element are not used to form the first synthetic beam pattern.

12. The method of claim 11, wherein:
the at least one first antenna element and the at least one second antenna element are arrayed in a direction away from the second antenna,
the at least one first antenna element is closer to the second antenna than the at least one second antenna element,
the at least one third antenna element and the at least one fourth antenna element are arrayed in a direction away from the first antenna, and
the at least one third antenna element is closer to the first antenna than the at least one fourth antenna element.

13. The method of claim 11, wherein:
the at least one first antenna element comprises plural first antenna elements;
the at least one second antenna element comprises plural second antenna elements;
the at least one third antenna element comprises plural third antenna elements;
the at least one fourth antenna element comprises plural fourth antenna elements;
the first antenna elements are arrayed two-dimensionally,
the second antenna elements are arrayed two-dimensionally,
the third antenna elements are arrayed two-dimensionally,
the fourth antenna elements are arrayed two-dimensionally,
the first synthetic beam pattern is formed using at least one of the first antenna elements and at least one of the third antenna elements,
a shortest distance between the at least one of the first antenna elements and a second area is shorter than a first distance, the second area being surrounded by connecting antenna elements located at an outer edge of an array of the third antenna elements and the fourth antenna elements, and
a shortest distance between the at least one of the third antenna elements and a first area is shorter than the first distance, the first area being surrounded by connecting antenna elements located at an outer edge of an array of the first antenna elements and the second antenna elements.

14. The method of claim 11, comprising:
forming a first beam pattern using the at least one first antenna element and the at least one second antenna element,
forming a second beam pattern using the at least one third antenna element and the at least one fourth antenna element, and
forming the first synthetic beam pattern using a first number of the at least one first antenna element and a second number of the at least one third antenna element,
when the first number is larger than the second number, the first synthetic beam pattern is between the first beam pattern and the second beam pattern and is closer to the first beam pattern than the second beam pattern, and when the second number is larger than the first number, the first synthetic beam pattern is between the first beam pattern and the second beam pattern and is closer to the second beam pattern than the first beam pattern.

15. The method of claim 11, wherein:
the at least one first antenna element comprises plural first antenna elements;
the at least one second antenna element comprises plural second antenna elements;
the at least one third antenna element comprises plural third antenna elements;
the at least one fourth antenna element comprises plural fourth antenna elements;
the first antenna elements are arrayed two-dimensionally on the first planar substrate;
the second antenna elements are arrayed two-dimensionally on the first planar substrate,
the third antenna elements are arrayed two-dimensionally on the second planar substrate,
the fourth antenna elements are arrayed two-dimensionally on the second planar substrate,
an array of the first antenna elements is closer to the second antenna than an array of the second antenna elements, and
an array of the third antenna elements is closer to the first antenna than an array of the fourth antenna elements.

16. The method of claim 15, wherein:
a size of the array of the first antenna elements is equal to a size of the array of the second antenna elements, and
a size of the array of the third antenna elements is equal to a size of the array of the fourth antenna elements.

17. The method of claim 11, wherein:
the electronic device further comprises a third antenna comprising at least one fifth antenna element and at least one sixth antenna element on a third planar substrate, an orientation of the third planar substrate being different from the orientation of the first planar substrate and the orientation of the second planar substrate,
the method further comprises forming a second synthetic beam pattern using the at least one fourth antenna element and the at least one fifth antenna element, and
the at least one sixth antenna element is not used to form the second synthetic beam pattern.

18. The method of claim 11, wherein:
the electronic device further comprises a third antenna comprising at least one fifth antenna element and at least one sixth antenna element on a third planar substrate, an orientation of the third planar substrate being different from the orientation of the first planar substrate and the orientation of the second planar substrate,
the method further comprises forming a second synthetic beam pattern using the at least one first antenna element, the at least one third antenna element, and the at least one fifth antenna element,
wherein the at least one sixth antenna element is not used to form the second synthetic beam pattern.

19. The method of claim 11, comprising:
forming a first beam pattern using the at least one first antenna element and the at least one second antenna element; and
forming a second beam pattern using the at least one third antenna element and the at least one fourth antenna element.

20. The method of claim 17, comprising:
- forming a first beam pattern using the at least one first antenna element and the at least one second antenna element,
- forming a second beam pattern using the at least one third antenna element and the at least one fourth antenna element, and
- forming a third beam pattern using the at least one fifth antenna element and the at least one sixth antenna element.

* * * * *